United States Patent
Akiyama et al.

(10) Patent No.: US 10,843,683 B2
(45) Date of Patent: Nov. 24, 2020

(54) VEHICLE CONTROL DEVICE AND METHOD

(71) Applicant: Hitachi Automotive Systems, Ltd., Hitachinaka (JP)

(72) Inventors: Yuki Akiyama, Tokyo (JP); Junya Takahashi, Tokyo (JP); Toshiyuki Innami, Hitachinaka (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 148 days.

(21) Appl. No.: 16/086,463

(22) PCT Filed: Mar. 24, 2017

(86) PCT No.: PCT/JP2017/011904
§ 371 (c)(1),
(2) Date: Sep. 19, 2018

(87) PCT Pub. No.: WO2017/179391
PCT Pub. Date: Oct. 19, 2017

(65) Prior Publication Data
US 2019/0054916 A1    Feb. 21, 2019

(30) Foreign Application Priority Data
Apr. 12, 2016 (JP) .................... 2016-079590

(51) Int. Cl.
*B60W 30/045* (2012.01)
*B62D 6/00* (2006.01)
(Continued)

(52) U.S. Cl.
CPC ......... *B60W 30/045* (2013.01); *B60G 17/016* (2013.01); *B60G 17/0162* (2013.01);
(Continued)

(58) Field of Classification Search
CPC .... B60W 30/045; B60W 10/00; B60W 10/04; B60W 10/08; B60W 10/20; B60W 10/22;
(Continued)

(56) References Cited

U.S. PATENT DOCUMENTS

| 5,762,157 A | 6/1998 | Uehara |
| 8,977,464 B1* | 3/2015 | Takahashi ........... B60W 30/045 701/70 |

(Continued)

FOREIGN PATENT DOCUMENTS

| DE | 10 2004 004 870 A1 | 8/2005 | |
| DE | 102004004870 A1 * | 8/2005 | ............ B60W 30/02 |

(Continued)

OTHER PUBLICATIONS

Extended European Search Report issued in counterpart European Application No. 17782209.5 dated Sep. 25, 2019 (nine (9) pages).
(Continued)

*Primary Examiner* — Yazan A Soofi
(74) *Attorney, Agent, or Firm* — Crowell & Moring LLP

(57) ABSTRACT

The present invention provides a vehicle control device and method capable of ensuring steering accuracy. In a vehicle provided with a left-right pair of steered wheels for which the braking/driving forces can each be controlled, and a steering force generation device that generates steering force for the steered wheels and controls the steering angle of the steered wheels, this vehicle control device and method control the steering force and the steering reaction force from the steering force generation device by controlling the braking/driving force of each of the steered wheels on the basis of the lateral force acting on the steered wheels.

15 Claims, 21 Drawing Sheets

(51) Int. Cl.

| | | |
|---|---|---|
| *B60G 17/0195* | (2006.01) | |
| *B60W 10/188* | (2012.01) | |
| *B60W 10/20* | (2006.01) | |
| *B60W 10/22* | (2006.01) | |
| *B60W 30/12* | (2020.01) | |
| *B60W 10/08* | (2006.01) | |
| *B60G 17/016* | (2006.01) | |
| *B60T 8/00* | (2006.01) | |
| *B62D 5/00* | (2006.01) | |
| *B60W 10/18* | (2012.01) | |
| *B62D 5/04* | (2006.01) | |
| *B60W 10/04* | (2006.01) | |
| *B60W 10/00* | (2006.01) | |
| *B62D 7/14* | (2006.01) | |
| *B62D 6/04* | (2006.01) | |

(52) U.S. Cl.
CPC ............ *B60G 17/0195* (2013.01); *B60T 8/00* (2013.01); *B60W 10/00* (2013.01); *B60W 10/04* (2013.01); *B60W 10/08* (2013.01); *B60W 10/18* (2013.01); *B60W 10/188* (2013.01); *B60W 10/20* (2013.01); *B60W 10/22* (2013.01); *B60W 30/12* (2013.01); *B62D 5/006* (2013.01); *B62D 5/008* (2013.01); *B62D 5/0409* (2013.01); *B62D 5/0463* (2013.01); *B62D 6/00* (2013.01); *B62D 6/002* (2013.01); *B62D 6/003* (2013.01); *B62D 6/04* (2013.01); *B62D 7/146* (2013.01); *B60W 2520/10* (2013.01); *B60W 2520/125* (2013.01); *B60W 2520/14* (2013.01); *B60W 2540/18* (2013.01); *B60W 2710/18* (2013.01); *B60W 2710/182* (2013.01); *B60W 2710/207* (2013.01); *B60W 2710/22* (2013.01); *B60W 2720/30* (2013.01); *Y02T 10/72* (2013.01)

(58) Field of Classification Search
CPC ... B60W 30/12; B60G 17/016; B60G 17/162; B60G 17/195; B62D 6/00; B62D 6/002; B62D 6/003; B62D 6/04; B62D 7/146
USPC .......................................................... 701/37
See application file for complete search history.

(56) References Cited

U.S. PATENT DOCUMENTS

| | | | |
|---|---|---|---|
| 2003/0217885 A1 | 11/2003 | Aoki et al. | |
| 2006/0041364 A1 | 2/2006 | Tsukasaki et al. | |
| 2010/0070135 A1 | 3/2010 | Wang et al. | |
| 2010/0228444 A1* | 9/2010 | Kojo .................... | B60T 8/1755 701/42 |
| 2010/0250083 A1* | 9/2010 | Takahashi ............. | B60T 8/1755 701/70 |
| 2012/0226417 A1 | 9/2012 | Nishikawa | |
| 2013/0197755 A1* | 8/2013 | Otake ................... | B60G 17/08 701/38 |
| 2014/0145498 A1* | 5/2014 | Yamakado ............ | B60W 10/08 303/3 |
| 2015/0094927 A1* | 4/2015 | Takahashi ........... | B60W 30/025 701/93 |
| 2018/0086340 A1* | 3/2018 | Nagatsuka ............ | B60W 10/04 |

FOREIGN PATENT DOCUMENTS

| | | | |
|---|---|---|---|
| JP | 2003-220964 A | | 8/2003 |
| JP | 2005-153716 A | | 6/2005 |
| JP | 2006-187047 A | | 7/2006 |
| JP | 2010-69984 A | | 4/2010 |
| JP | 2010-076739 | | 4/2010 |
| JP | 2012-121507 A | | 6/2012 |
| JP | 2012-136090 A | | 7/2012 |
| JP | 2013-203238 A | | 10/2013 |
| JP | 2015-74421 A | | 4/2015 |
| JP | 2015074421 A | * | 4/2015 |
| WO | WO 2011/128999 A1 | | 10/2011 |
| WO | WO 2012/063657 A1 | | 5/2012 |

OTHER PUBLICATIONS

Japanese-language Office Action issued in counterpart Japanese Application No. 2016-079590 dated Aug. 13, 2019 with English translation (eight (8) pages).

International Search Report (PCT/ISA/210) issued in PCT Application No. PCT/JP2017/011904 dated Jun. 27, 2017 with English translation (five (5) pages).

Japanese-language Written Opinion (PCT/ISA/237) issued in PCT Application No. PCT/JP2017/011904 dated Jun. 27, 2017 (four (4) pages).

* cited by examiner

FIG. 6
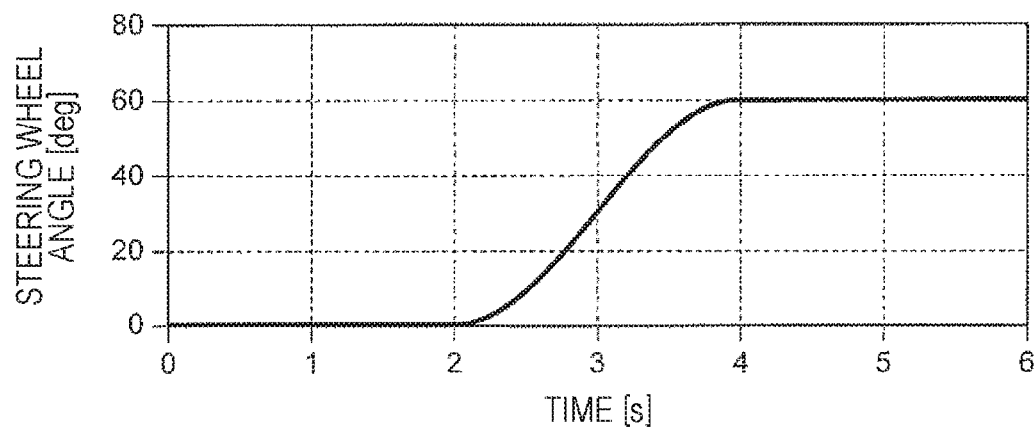
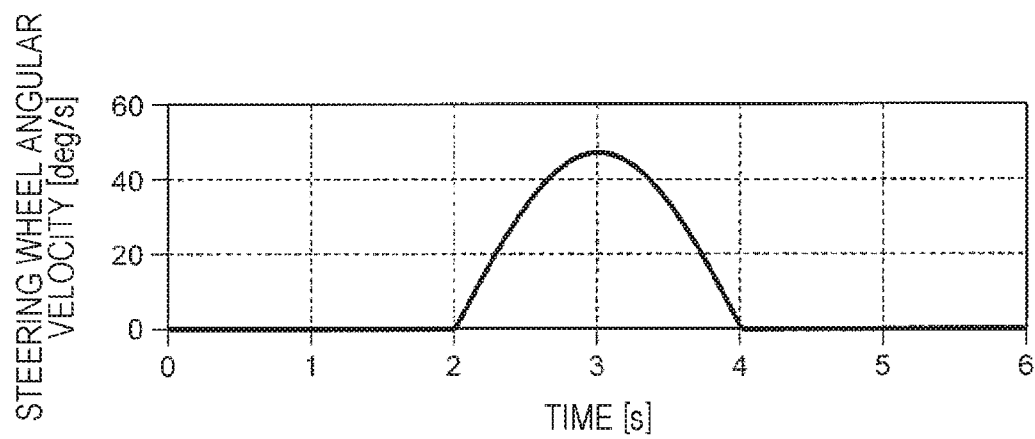
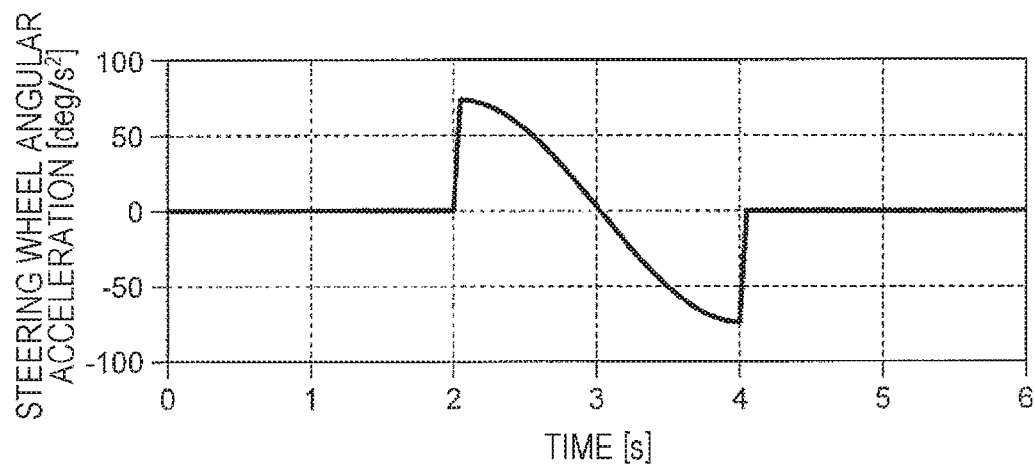

FIG. 15
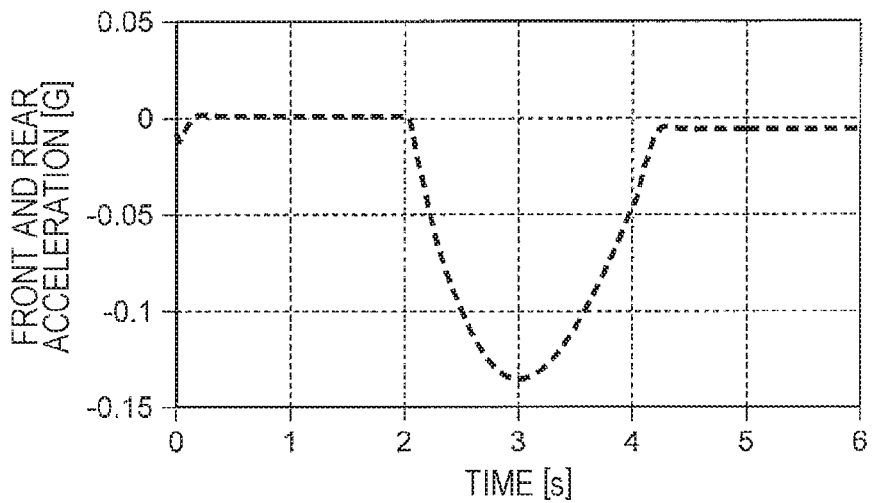
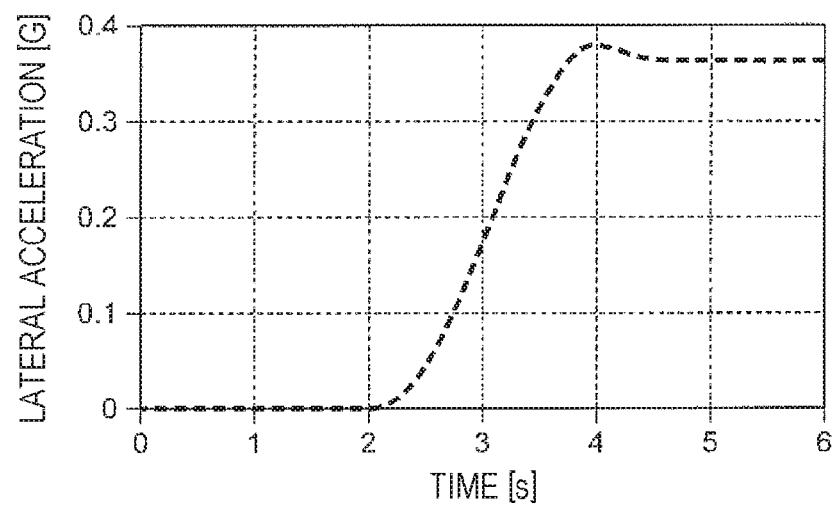
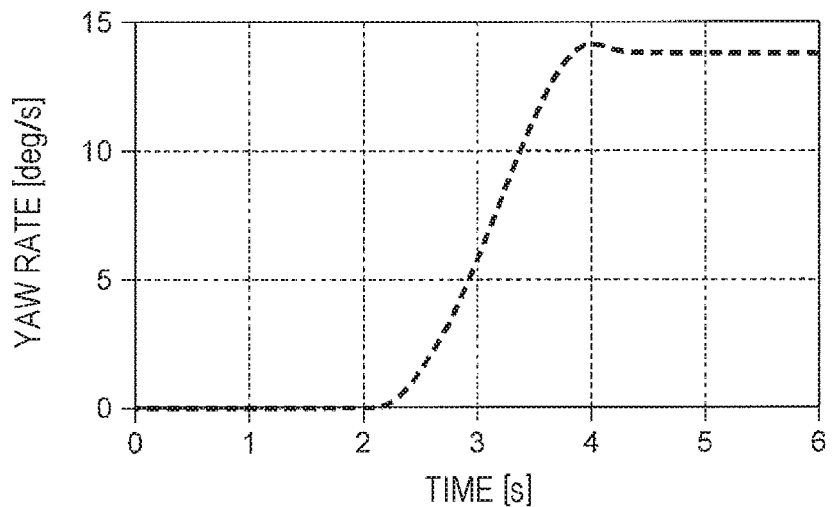

FIG. 16
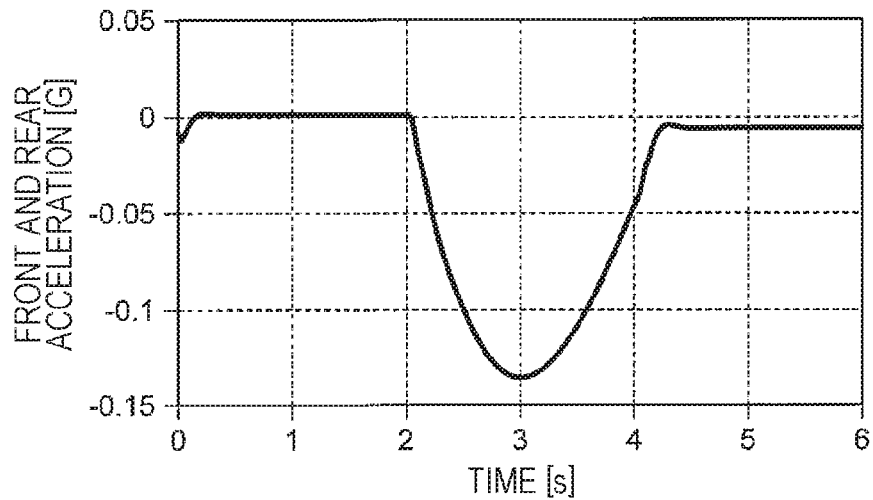
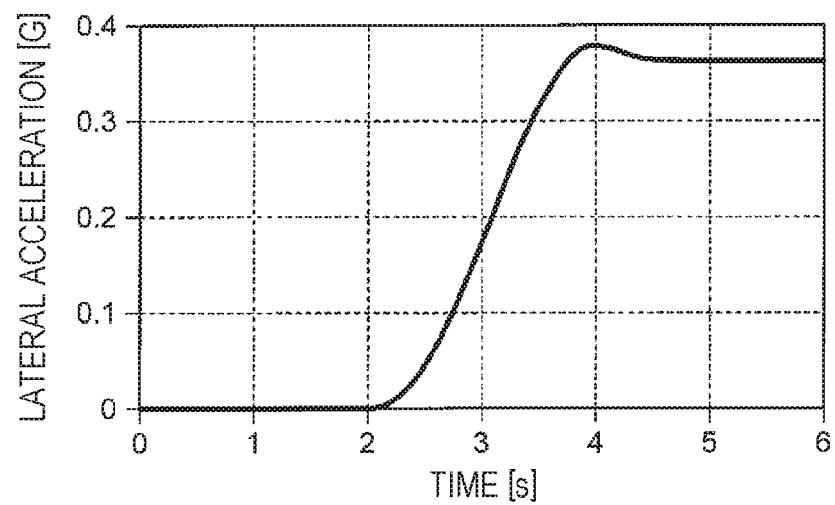
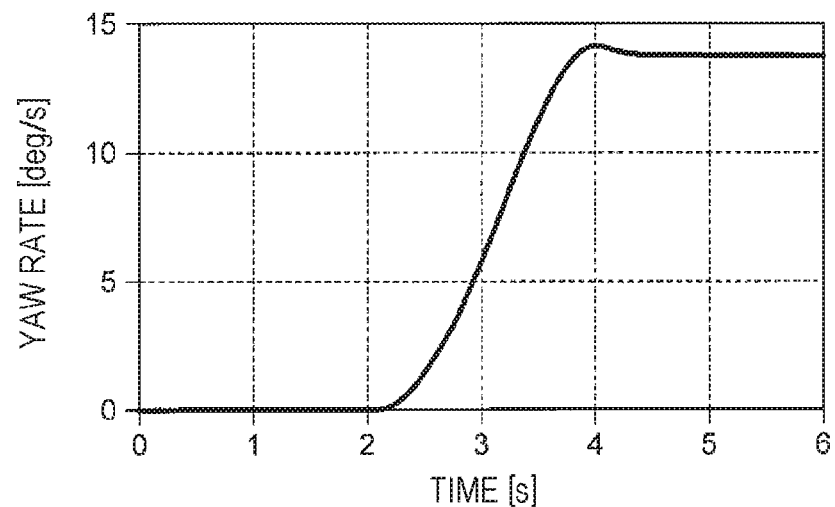

FIG. 21

| RIGHT AND LEFT DISTRIBUTION OF BRAKING FORCE | STEERING WHEEL TORQUE | ROLL MOMENT |
|---|---|---|
| DEVIATION IN LEFT | INCREASED | RESTRAINED |
| DEVIATION IN RIGHT | DECREASED | PROMOTED |

VEHICLE CONTROL DEVICE AND METHOD

TECHNICAL FIELD

The present invention relates to a vehicle control device and a method, and in particular to a vehicle control device and a method for controlling a steering force or a steering reaction force of a steering force generation device disposed in a vehicle such as an automobile.

BACKGROUND ART

In a steering device of a vehicle such as a passenger car, an electric power steering is excellent in energy saving, and it is advantageous in that not only a boosting function but also an assisting function of actively steering and an automatic steering function can be incorporated by control. Thus, an electric power steering is a recent major power steering system.

Contrary to the hydraulic power steering that amplifies a force by applying hydraulic pressure to a cylinder integrated with a steering rack by an action of a hydraulic circuit, in the electric power steering, control is performed by a motor that outputs according to a calculation result of a feedback of information of a steering torque sensor, and increase in friction and inertia due to addition of a motor and a deceleration mechanism of the motor cannot be avoided, which results in limitation of controllability. Particularly, in an inexpensive electric power steering for which a large budget cannot be allowed for reduction of tooth surface friction of a deceleration mechanism, weight reduction of a movable portion, improvement of responsiveness of a motor, or the like, there may be unnaturalness and discomfort in steering feeling.

Further, in automatic operation in which a driver does not hold (operate) a steering wheel, the whole steering force transmitted to a wheel (steered wheel) is generated by the electric power steering, and the apparent rigidity of the entire steering mechanism relatively decreases. In particular, in a column electric power steering, it is difficult to secure the rigidity of a mounting portion as compared with a rack type or a dual pinion type that receives a reaction force of power steering with a steering rack, and the mechanism also receives the reaction force in a position far from the wheel (tire) via a column axis. Therefore, the amount of deformation of the mounting portion and the steering mechanism increases with respect to a steering force of the same degree of steering force, and an extent of decreasing of the apparent rigidity is large. Since this hinders correct steering, there is still room for improvement in the control of the steering force.

As a technique related to this, there is a method of imparting a steering force by an actuator other than a power steering device, and PTL 1 discloses a conventional technique for controlling a driving force of each wheel to control a steering torque (steering force) in a vehicle in which four wheels (left, right, front and rear wheels) are each driven by independent motors.

CITATION LIST

Patent Literature

PTL 1: JP 2006-187047 A

SUMMARY OF INVENTION

Technical Problem

Friction and inertia at the start of operation (turning start) of a steering mechanism impair steering feeling when a driver operates a steering wheel, resulting in difficulty in correct steering and obstructing the steering of the vehicle as intended. The amount of deformation of an arm, a shaft, a bush, a mount and the like composing the steering mechanism increases due to a load applied to the steering mechanism, causing steering deviation from a situation where the load is light.

However, according to the conventional technique disclosed in PTL 1, a control rule conforming to the target steering force characteristic is not shown, and influences of friction and inertia at the start of operation of the steering mechanism, and the rigidity of the steering mechanism as described above are not considered. Therefore, in such a case, the steering accuracy cannot be secured.

The present invention has been made in view of the above problems, and it is an object of the present invention to provide a vehicle control device and a method capable of ensuring the steering accuracy.

Solution to Problem

In order to achieve the object described above, a vehicle control device and a method according to the present invention is a vehicle control device and a method that controls a vehicle including a left-right pair of steered wheels of which braking/driving forces can be controlled for each of left and right, and a steering force generation device that generates a steering force for the steered wheels and controls a steering angle of the steered wheels, this vehicle control device and method control the steering force or a steering reaction force of the steering force generation device by controlling the braking/driving forces for each of the steered wheels on the basis of a lateral force acting on the steered wheels.

Advantageous Effects of Invention

According to the present invention, since a steering force or a steering reaction force is controlled so as to improve a steering feeling and improve apparent rigidity of a steering mechanism, steering accuracy can be improved.

The problems, configurations, and effects other than those described above will be clarified from the description of the embodiments below.

BRIEF DESCRIPTION OF DRAWINGS

FIG. 6 is a diagram showing an example of an angle, angular velocity, and angular acceleration of the steering wheel from the turning start to the turning end.

FIG. 15 is a diagram showing simulation results of vehicle motion in the case of only the GVC under the same conditions as in FIG. 14.

FIG. 16 is a diagram showing simulation results of vehicle motion in the case where the brake hydraulic pressure required for the GVC is distributed to the left and right of each of the front and rear wheels under the same condition as in FIG. 14.

FIG. 21 is a chart showing influence on a steering wheel torque and a roll moment, by left and right bias of a braking force of the steered wheels at the time of the left turn of the vehicle having a negative scrub radius, to which a fifth embodiment of the vehicle control device according to the present invention is applied.

DESCRIPTION OF EMBODIMENTS

Embodiments of the present invention will be described below with reference to the drawings.

First Embodiment

In the present embodiment, the case where a steering wheel torque (steering reaction force) imparted to a driver who steers a vehicle via a steering wheel is controlled by a braking force will be described.

Figure 1:
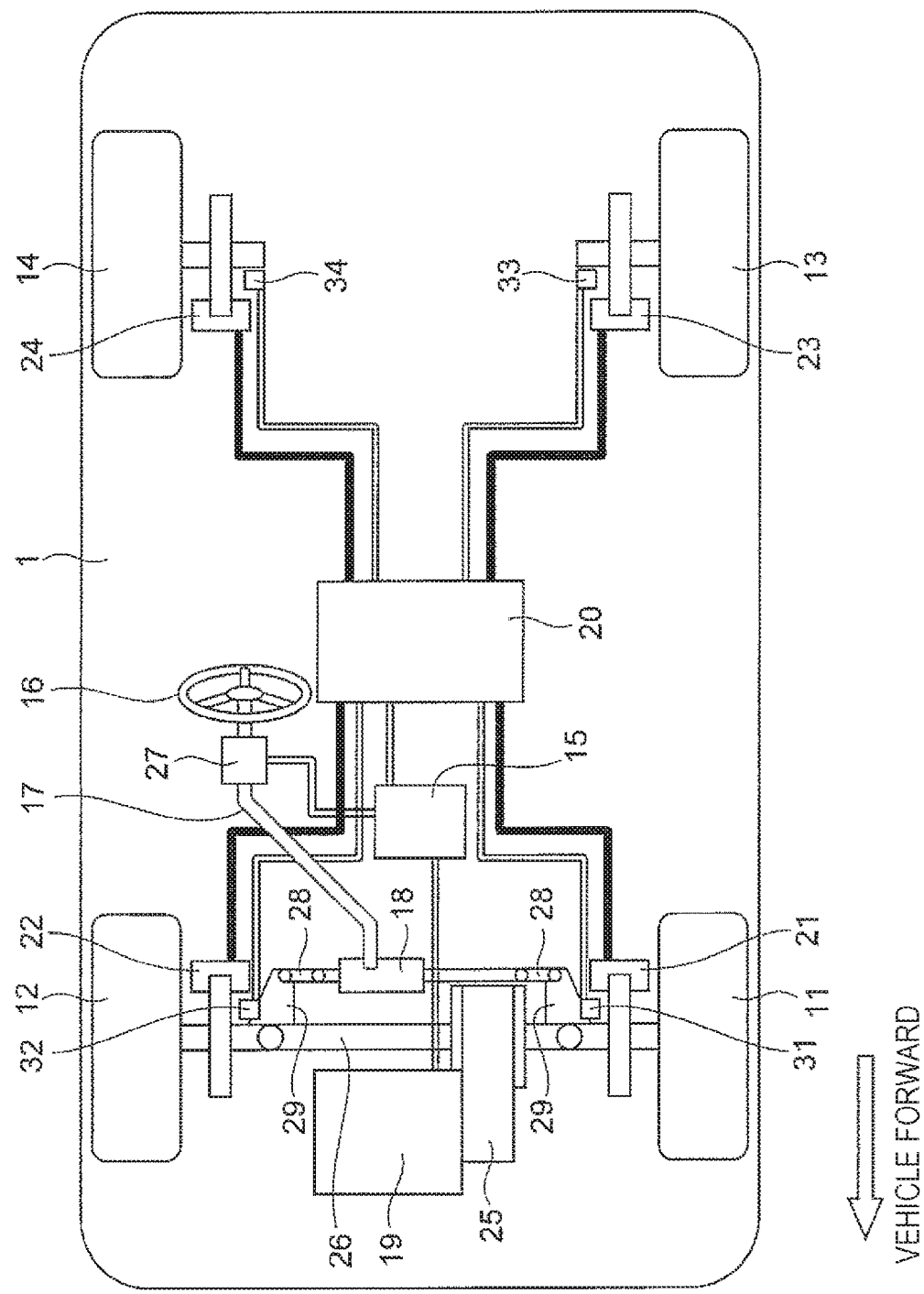
FIG. 1 is a diagram showing a system configuration of a mechanism and a control system of a vehicle in which braking forces of four wheels are independently controllable, and to which a first embodiment of a vehicle control device according to the present invention is applied.

FIG. 1 shows a system configuration of a mechanism and a control system of a vehicle 1 in which braking forces of four wheels (left front wheel 11, right front wheel 12, left rear wheel 13, right rear wheel 14) can be independently controlled, and the front wheels 11, 12 are steered wheels (wheels of which steering angle can be controlled by a steering mechanism). A steering wheel 16 and the front wheels 11, 12 are coupled with each other via a steering column shaft 17, a steering rack 18, a steering tie rod 28, a steering knuckle 29, and the like such that the steering power (steering force) can be transmitted between the steering wheel 16 operated by the driver and the front wheels 11, 12 that are the steered wheels. An electric power steering device 27 provided on the steering column shaft 17 is a column type in which a torque is applied to the steering column shaft 17. However, the application target of the present embodiment is not limited to the column type electric power steering vehicle.

In the present embodiment, for the sake of convenience, the electric power steering device 27 and the steering wheel 16 are combined as a steering force generation device that generates (transmits) the steering force with respect to the front wheels 11, 12 that are steered wheels, to control the steering angle of the front wheels 11, 12.

A drive system of the vehicle 1 is configured such that a power of a driving device 19 is transmitted to the front wheels 11, 12 that are driving wheels, via a decelerator 25 and a drive shaft 26.

The vehicle 1 includes, as sensors, four wheel speed sensors 31, 32, 33, 34, a steering angle sensor built in the electric power steering device 27, an acceleration sensor not shown, a brake pedal force sensor, accelerator opening degree sensor and the like. Information obtained from each sensor is input to a vehicle motion integrated control device (vehicle control device) 15 via a braking control device 20 or directly. The vehicle motion integrated control device 15 transmits a braking force command for each of the wheels 11, 12, 13, 14 to the braking control device 20 on the basis of the information obtained from each sensor, and the braking control device 20 applies the hydraulic pressure to braking devices 21, 22, 23, 24 of each of the wheels that are hydraulic actuators in accordance with the received braking force command, to generate braking forces on the each of the wheels 11, 12, 13, 14.

Figure 2:
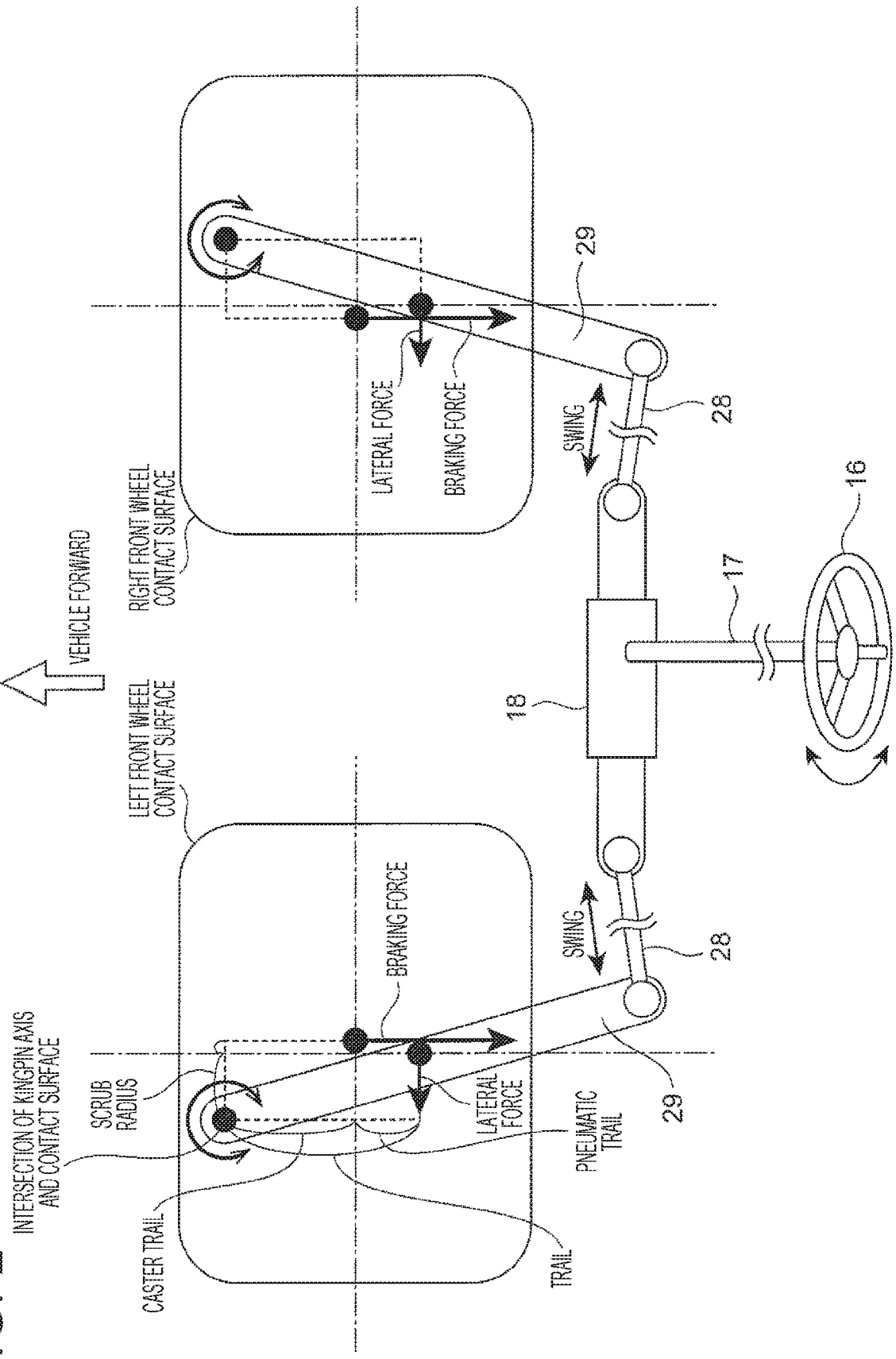
FIG. 2 is a diagram schematically showing a relationship between a steering mechanism of the vehicle and a force acting on a tire.

FIG. 2 shows a relationship between the forces acting on the steering mechanism and the tire (tire provided on each wheel) of the vehicle 1. Braking/driving forces (braking force or driving force) in the front and rear direction and a lateral force in the lateral direction (with respect to the tire) act on each tire in between each tire and a road surface.

The braking or driving force in the front and rear direction acts on the center in the left and right direction of tire contact surface pressure distribution. As long as there is no large bias in the left and right direction in the contact surface pressure distribution due to extreme negative camber or the like, the braking or driving force acts in the vicinity of the center in the left and right direction of the tire.

The lateral force is caused by the tire rolling while the tire causes a side slip angle with deformation. Therefore, the lateral force acts rearward with respect to a rolling direction from the center in the front and rear direction of the tire contact surface.

Here, since the tire rotates about a kingpin axis that is a steered axis, if a force acts on a point having a moment arm, a torque acting around the kingpin axis, that is, a kingpin torque is generated.

A moment arm length of the lateral force around the kingpin axis is a distance between an intersection of the kingpin axis and the tire contact surface, and the point of application of the lateral force in the tire contact surface.

On the other hand, related positions of a moment arm length of the braking or driving force around the kingpin axis differ depending on where the braking or driving force is received. Specifically, the positions differ depending on whether the braking or driving force is received at a portion fixed to the steering knuckle 29 that is movable with steering, or the braking or driving force is received at a side of a vehicle body that is not movable by steering. In a friction brake mechanism of a general structure in which a brake rotor (not shown) is fixed coaxially with a tire, a braking force is received by the steering knuckle 29 that is movable with steering. Even in the case of a vehicle having an in-wheel motor in which a driving wheel and a driving motor are integrated, the braking or driving force by the motor is also received by the steering knuckle 29.

In these cases, in transmitting of the force, since it is equivalent to that the tire is integrated with the steering knuckle 29, the point of application of the braking or driving force with respect to the vehicle body is located on the tire contact surface, and a moment arm is determined by a positional relationship between the point of application and the kingpin axis. Here, since the lateral distance from the intersection of the kingpin axis and the tire contact surface to the center of the tire contact surface is the scrub radius, the moment arm length is equal to the scrub radius.

On the contrary, in a general driving system configuration in which an engine and a driving motor are mounted on a vehicle body as the driving device 19, the braking/driving forces by the driving device 19 are received by the vehicle body side that is not movable by the steering. Braking by the driving device 19 refers to regenerative braking by an engine brake or a traveling motor. Also, in the case of a vehicle having an inboard brake in which a friction brake mechanism is provided on the upstream side of the drive system from the drive shaft 26, the braking force is received on the vehicle body side.

In these cases, a torque of the tire (each wheel) is transmitted by the drive shaft 26, the point of application of the braking/driving forces with respect to the vehicle body is located on the three-dimensional center of a cylindrical tire, and a moment arm is determined by a positional relationship between the point of application and the kingpin axis. Here, since the lateral distance between the center of the tire and the kingpin axis is an on-axle kingpin offset, the moment arm length in this case is equal to the on-axle kingpin offset.

As described above, which of the scrub radius and the on-axle kingpin offset the moment arm length of the braking/driving forces around the kingpin axis corresponds to is determined not by the difference between braking and driving, but by the point of application. However, in the following description, in order to avoid complication, unless otherwise noted, description will be made with a premise that the driving is performed by the driving device 19 mounted on the vehicle body, and most of the braking force is generated by a general friction brake mechanism that is not in-board type. The moment arm length of the braking/driving forces around the kingpin axis refers to any corresponding one of the scrub radius and the on-axle kingpin offset.

With the above contents as a premise, the relationship between the force acting on the tire and the steering wheel torque (the steering reaction force of the steering force generation device) will be described. In this case, in the direction of a lateral force, the leftward is positive (the rightward is negative), in the direction of the braking/driving forces, the forward is positive (the backward is negative), and in the direction of the moment, counterclockwise is positive (clockwise is negative) (viewed from upward).

A moment $M_{LateralL}$ caused by a lateral force $F_{LateralL}$ around the kingpin axis of the left front wheel 11 is expressed by the following (Mathematical Formula 1) with a trail (see FIG. 2) as $\xi$.

$$M_{LateralL} = -F_{LateralL} \cdot \xi \qquad \text{(Mathematical Formula 1)}$$

Similarly, the moment $M_{LongL}$ caused by the braking/driving forces $F_{LongL}$ around the kingpin axis is given by the following (Mathematical Formula 2) with the moment arm length as $L_{Long}$.

$$M_{LongL} = F_{LongL} \cdot L_{Long} \qquad \text{(Mathematical Formula 2)}$$

Therefore, the total kingpin torque $M_L$ is expressed by the following (Mathematical Formula 3).

$$M_L = M_{LateralL} + M_{LongL} \qquad \text{(Mathematical Formula 3)}$$

This king pin torque $M_L$ is transmitted as a force applied from the steering knuckle 29 to a steering tie rod 28 and is transmitted from the steering tie rod 28 to the steering wheel 16 via the steering rack 18.

The steering wheel torque $H_L$ caused by the left front wheel 11 is expressed by the following (Mathematical Formula 4), where $R_S$ is the steering gear ratio (reduction ratio) (the ratio of the steering angle of the wheel with respect to the steering wheel angle of the steering wheel 16).

$$H_L = M_L / R_S \qquad \text{(Mathematical Formula 4)}$$

For the right front wheel 12, a moment $M_{LateralR}$ caused by a lateral force $F_{LateralR}$ around the kingpin axis of the right front wheel 12 is expressed by the following (Mathematical Formula 5).

$$M_{LateralR} = -F_{LateralR} \cdot \xi \qquad \text{(Mathematical Formula 5)}$$

The moment $M_{LongR}$ caused by the braking/driving forces $F_{LongR}$ around the kingpin axis is different from the above (Mathematical Formula 2) in sign, and is expressed by the following (Mathematical Formula 6).

$$M_{LongR} = -F_{LongR} \cdot L_{Long} \qquad \text{(Mathematical Formula 6)}$$

Therefore, the total kingpin torque $M_F$ is expressed by the following (Mathematical Formula 7).

$$M_R = M_{LateralR} + M_{LongR} \qquad \text{(Mathematical Formula 7)}$$

Then, the steering wheel torque $H_R$ caused by the right front wheel 12 is expressed by the following (Mathematical Formula 8).

$$H_R = M_R / R_S \qquad \text{(Mathematical Formula 8)}$$

Therefore, the steering wheel torque H caused by the left and right front wheels 11, 12 is expressed by the following (Mathematical Formula 9), so that the steering wheel torque is determined by the lateral force and braking/driving forces, except for each parameter that can be regarded as a substantially constant.

$$H = H_L + H_R \quad \text{(Mathematical Formula 9)}$$
$$= M_L/R_S + M_R/R_S$$
$$= (M_{LateralL} + M_{LongL} +$$
$$M_{LateralR} + M_{LongR})/R_s$$
$$= ((F_{LongL} - F_{LongR}) \cdot L_{Long-}$$
$$(F_{LateralL} + F_{LateralR}) \cdot \xi)/R_S$$

Since the lateral force is generated due to the relationship with the vehicle motion by steering, it is difficult to directly control the lateral force, whereas the braking/driving forces can be relatively easily controlled. Therefore, in this embodiment (the vehicle motion integrated control device 15), a method of controlling the steering wheel torque by increasing or decreasing the braking/driving forces of the steered wheels 11, 12 with the lateral force generated in the steered wheels 11, 12 included in calculation is adopted.

Here, the lateral force ($F_{LateralL}$+$F_{LateralR}$) acting on the tire is roughly calculated as the following (Mathematical Formula 10) from the vehicle speed V of the vehicle 1 and the steering wheel angle (angle corresponding to the steering angle of the steered wheels 11, 12) α of the vehicle 1 that are pieces of information that can be detected by a sensor, or from the lateral acceleration $G_y$ of the vehicle 1, when the side slip angle of the tire is around 0, with $W_F$ for the front wheel axle, l for the wheel base and g for the gravitational acceleration, and all values in (Mathematical Formula 9) are determined.

$$F_{LateralL} + F_{LateralP} = \quad \text{(Mathematical Formula 10)}$$
$$W_F/g \cdot G_y = W_F \cdot V^2 \cdot \alpha/(1 \cdot R_S \cdot g)$$

If the side slip angle of the tire is large and the lateral force is large, calculation may be performed by modeling the tire characteristics with high accuracy to the required level.

The above is the principle of controlling the steering wheel torque by the braking/driving forces.

Here, supplementary description will be made for the moment arm length of the braking/driving forces around the kingpin axis, that is, positive and negative of the scrub radius and the on-axle kingpin offset.

FIG. 2 shows a case where the intersection of the kingpin axis and the tire contact surface is outside the center of the tire contact surface, that is, the scrub radius is negative. Since the drawing is a plan view, the on-axle kingpin offset is not shown in the drawing, but regardless of whether the scrub radius is positive or negative, generally, the kingpin axis passes closer to the inside of the vehicle than the three-dimensional center of the tire, that is, the value of the on-axle kingpin offset is positive.

As understood from the above (Mathematical Formula 9), the direction of the force exerted by the braking/driving forces on the steering wheel torque is reversed depending on whether the moment arm length of the braking/driving forces around the kingpin axis is positive or negative. Therefore, in both the description of the present embodiment and the other embodiments described later, a relationship between which the left and right distribution of the braking/driving forces is biased toward and the increase and the decrease of the steering wheel torque is an example in the case where a sign of the scrub radius or the on-axle kingpin offset is temporarily determined.

In the present embodiment, the steering wheel torque is controlled by the braking force. However, when the braking force is applied, the vehicle 1 decelerates. Therefore, when a braking force is applied only to control the steering wheel torque, unnecessary deceleration occurs. Since the difference between the left and right braking forces influences the steering wheel torque as shown in (Mathematical Formula 9) described above, in the scene in which braking is required, the total braking force itself acting on the vehicle 1 is not changed, and the left and right distribution of the braking force in the steered wheels 11, 12 is changed (braking force left and right unequal distribution).

Next, a situation where control of the steering wheel torque is required will be described.

Figure 3:
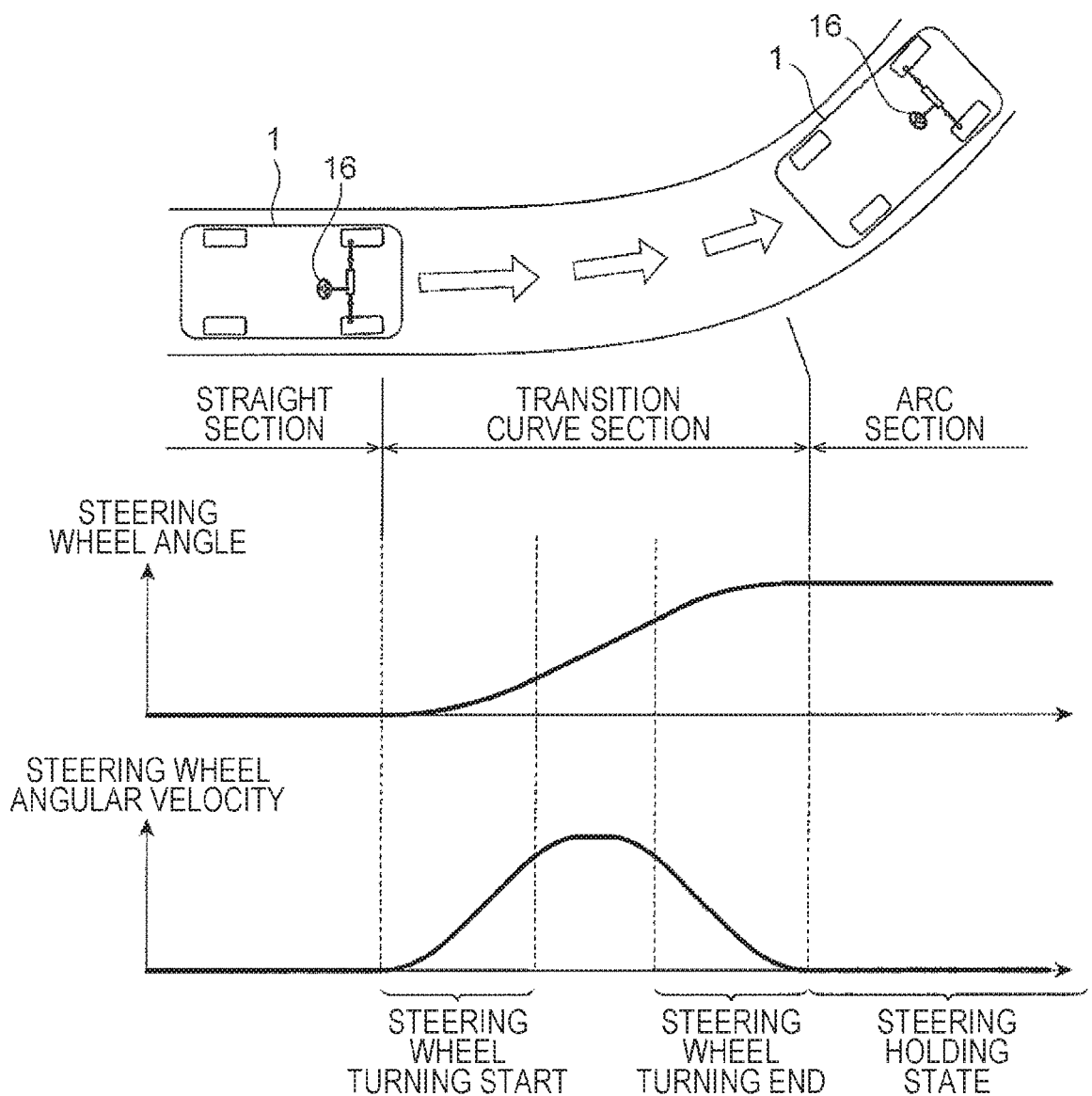
FIG. 3 is a diagram showing an example of a steering state when the vehicle enters a curved road.

FIG. 3 is a diagram showing an example of a steering state when the vehicle 1 enters a curved road.

As a general road design, a transition curve section in which the curvature gradually increases is provided from a straight section that is a straight road to an arc section that is an arcuate curved road of a certain curvature. Generally, steering wheel operation by a driver in traveling along a lane of a road having such a shape is operation of starting to turn from a state where the steering wheel angle (that is, the steering angle) of the steering wheel 16 is neutral, and holding steering by settling the steering wheel angle to an angle with which a traveling track of the vehicle 1 corresponds to the radius of the curved road. Hereinafter, a stage of the first operation of turning the steering wheel 16 is referred to as "turning start", and a stage of operation for settling to a certain angle is referred to as "turning end".

Especially when the vehicle does not travel along a predetermined lane, as long as the angular velocity (steering wheel angular velocity) of the steering wheel operation is finite and steering is performed while the vehicle is travelling, the track inevitably has a transition curve section. Thus, there are stages of turning start and turning end. Even when there is no section of fixed curvature in the track, the stage of stopping the operation of turning the steering wheel 16 is referred to as turning end.

First, see the stage of turning start among the stages described above.

In the electric power steering, the motor and speed reduction mechanism of the motor are added to the steering mechanism, so that friction and inertia increase. The influence becomes particularly noticeable at the turning start of the steering wheel 16.

If the driver can perceive only the force of the tire, the driver can sense the force acting on the vehicle 1 and operation of the vehicle 1 is easy to be performed at will (freely). However, at the turning start of the steering wheel 16, the steering force is transmitted to the tire only after being against the friction (force) and inertia (force) of the steering mechanism.

Figure 4:
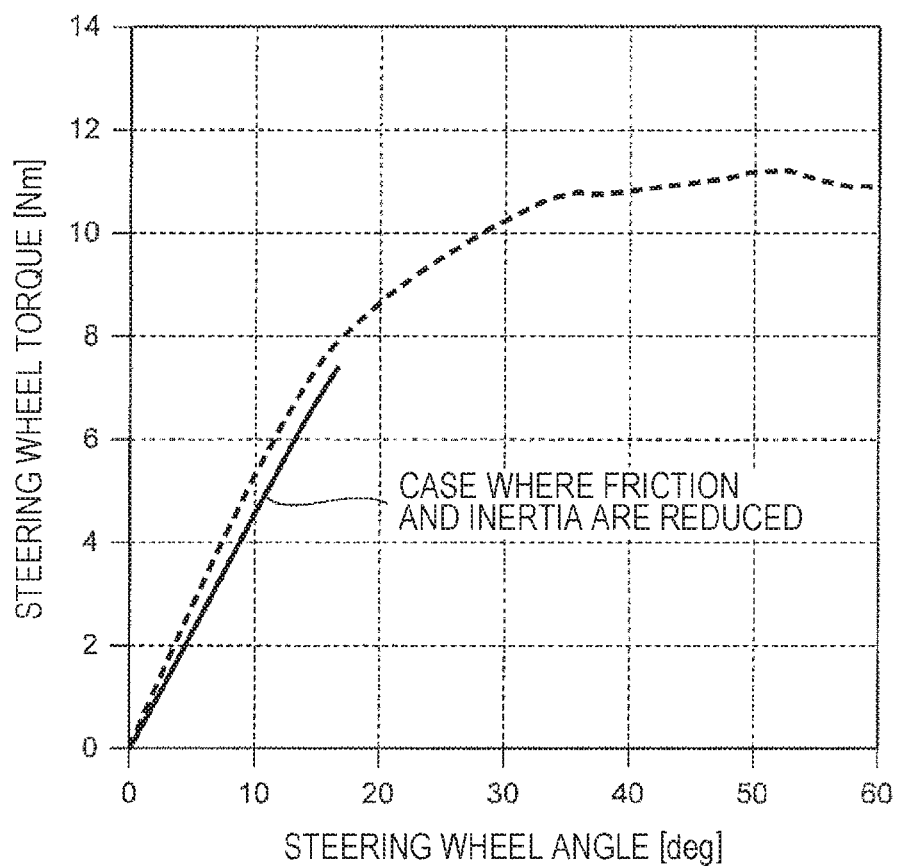
FIG. 4 is a diagram showing a desirable relationship between a steering wheel angle and a steering wheel torque at a turning start of the steering wheel.

FIG. 4 is a diagram showing a desirable relationship between a steering wheel angle and a steering wheel torque at the start of steering of the steering wheel 16. As the steering wheel 16 is turned, the side slip angle of the steered wheels 11, 12 increases, and the force that the tire receives from the road surface increases. The driver controls the vehicle 1 by feeling the force caused by the tire through the steering wheel 16, but a force other than the force caused by the tire due to the friction and inertia of the steering mechanism acts as the steering wheel torque. Therefore, these impart a driver with an unfavorable feeling of a friction feeling that is a feeling of not starting to move smoothly and a feeling of inertia that is a feeling of an excessive weight at the starting of movement. Assuming that friction and inertia are reduced at the turning start, the characteristic shown by the broken line in FIG. 4 changes to the characteristic indicated by the solid line.

On the other hand, the frictional force of the steering mechanism has an effect of making the steering wheel angle (steering angle) easy to be settled to an angle intended by the driver at the point where the steering wheel 16 is turned. At this time, the inertia of the steering mechanism hinders the deceleration of the angular velocity of the steering wheel 16 being turned, so that the inertia is an obstacle to the operation of the steering end of settling the steering wheel angle (steering angle).

Figure 5:
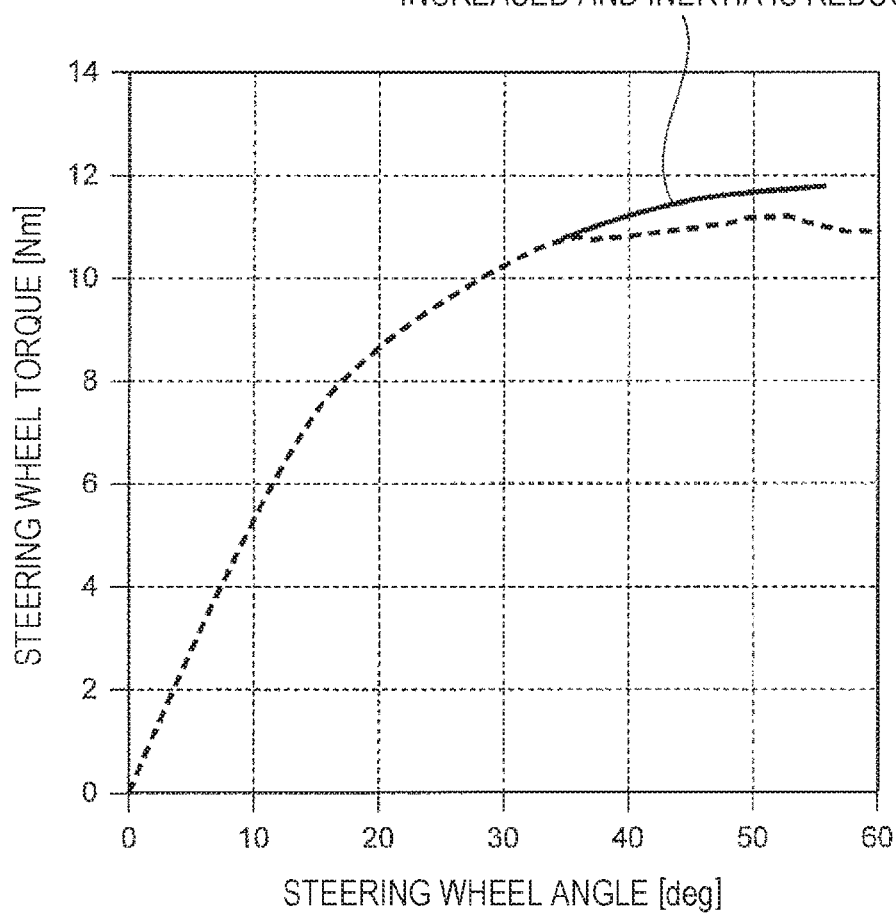
FIG. 5 is a diagram showing a desirable relationship between the steering wheel angle and the steering wheel torque at a turning end of the steering wheel.

FIG. 5 is a diagram showing a desirable relationship between the steering wheel angle and the steering wheel torque at the end of steering of the steering wheel 16. Since this turning end is an operation of stopping the change of the steering wheel angle (steering angle) of the steering wheel 16, increasing the steering wheel torque promotes the deceleration of the steering wheel angular velocity and assists the driver's intended operation. Assuming that the friction is increased and the inertia is reduced at the turning end, the characteristic shown by the broken line in FIG. 5 changes to the characteristic indicated by the solid line.

Therefore, when the vehicle 1 enters the curved road, if the steering wheel torque is controlled to a direction of reducing the steering wheel torque in the turning start of the steering wheel 16, and controlled to a direction of increasing the steering wheel torque in the turning end, the steering accuracy can be improved.

Next, a method of changing the direction of controlling the steering wheel torque at the turning start and the turning end of the steering wheel 16 will be described.

FIG. 6 shows an example of an angle (steering wheel angle), angular velocity (steering wheel angular velocity), and angular acceleration (steering wheel angular acceleration) of the steering wheel 16 from the turning start to the turning end. From a time when the angle of the steering wheel 16 increases from neutral until the angle is held to be a certain angle (60° in the illustrated example), the angular velocity of the steering wheel 16 once increases from 0 and returns to 0. The angular acceleration of the steering wheel 16 first reaches a positive value, then decelerates, falls below 0, becomes a negative value, and then returns to 0. In this manner, the angular acceleration of the steering wheel 16, that is, signs of the steering angular acceleration of the steered wheels 11, 12 are reversed at the turning start and the turning end. Thus, the steering angular acceleration can be correlated with the direction in which the steering wheel torque is controlled. Furthermore, as the steering is steep, or the steering stop is steep, the absolute value of the steering angular acceleration increases. It is necessary to reduce the steering wheel torque as steering is steep, and it is necessary to increase the steering wheel torque as the steering stop way is steep. Thus, the object described above can be achieved by increasing or decreasing the braking force of steered wheels 11, 12, depending on the value of the steering angular acceleration including the signs.

Therefore, the control rule of the steering torque on the basis of the steering angular acceleration and the lateral force of the steered wheels 11, 12 will be described.

As indicated by (Mathematical Formula 9) described above, the steering wheel torque is determined by the lateral force and the braking/driving forces. When the lateral force is relatively large, the influence of the braking/driving forces on the steering wheel torque becomes smaller than in the case where the lateral force is relatively small. Considering this point, in order to control the steering wheel torque using the braking force of the steered wheels 11, 12 according to the steering angular acceleration of the steered wheels 11, 12, it is necessary to make a difference between the left and right braking forces of the steered wheels 11, 12 larger as the lateral force ($F_{LateralL}+F_{LateralR}$) is larger even with the same steering angular acceleration.

Specifically, the difference ($F_{LongL}-F_{LongR}$) between the left and right braking forces of the steered wheels 11, 12 are imparted as the following (Mathematical Formula 11), where the steering angular acceleration is $A_H$ and a gain as a tuning parameter of the steering wheel torque is $P_A$. Here, the value of $P_A$ is determined so as to approach to the target steering wheel torque characteristic (the target value of the steering reaction force of a predetermined steering force generation device).

$$F_{LongL}-F_{LongR}=A_H \cdot |F_{LateralL}+F_{LateralR}| \cdot P_A$$ (Mathematical Formula 11)

Here, in order to avoid increasing the deceleration of the vehicle 1 only for the steering wheel torque control, it is necessary to set the maximum value $F_{LongMax}$ to the magnitude $|F_{LongL}+F_{LongR}|$ of the total left and right braking forces of the steered wheels 11, 12.

The maximum value of the difference ($F_{LongL}-F_{LongR}$) between the left and right braking forces of the steered wheels 11, 12 is for a case where only one wheel is braked by the braking force of $F_{LongMAX}$. For example, when only the left front wheel 11 is braked, the following (Mathematical Formula 12) is established.

$$F_{LongL}-F_{LongR}=-F_{LongMAX}-0$$ (Mathematical Formula 12)

In this case, the upper limit $H_{MAX}$ of the control width of the steering wheel torque H is given by the following (Mathematical Formula 13) from the above (Mathematical Formula 9).

$$H_{MAX}=|(-F_{LongMAX} \cdot L_{Long}-(F_{LateralL}+F_{LateralR}) \cdot \xi)/R_S|$$ (Mathematical Formula 13)

Therefore, since the control width of the steering wheel torque H depends on $F_{LongMAX}$, the steering wheel torque control by the braking forces of the steered wheels 11, 12 in the present embodiment is control applied in a situation where braking that is sufficient for performing the steering wheel torque control in steering is performed.

Next, a method for controlling the steering wheel torque by correlating steering and braking or driving will be described in detail.

G-Vectoring Control (hereinafter referred to as GVC) is a known technique for controlling a vehicle by correlating steering and braking or driving. This GVC is control of determining the acceleration or deceleration in the front and rear direction of the vehicle in accordance with the lateral jerk that is the time rate of change of lateral acceleration caused by the steering.

Figure 7:
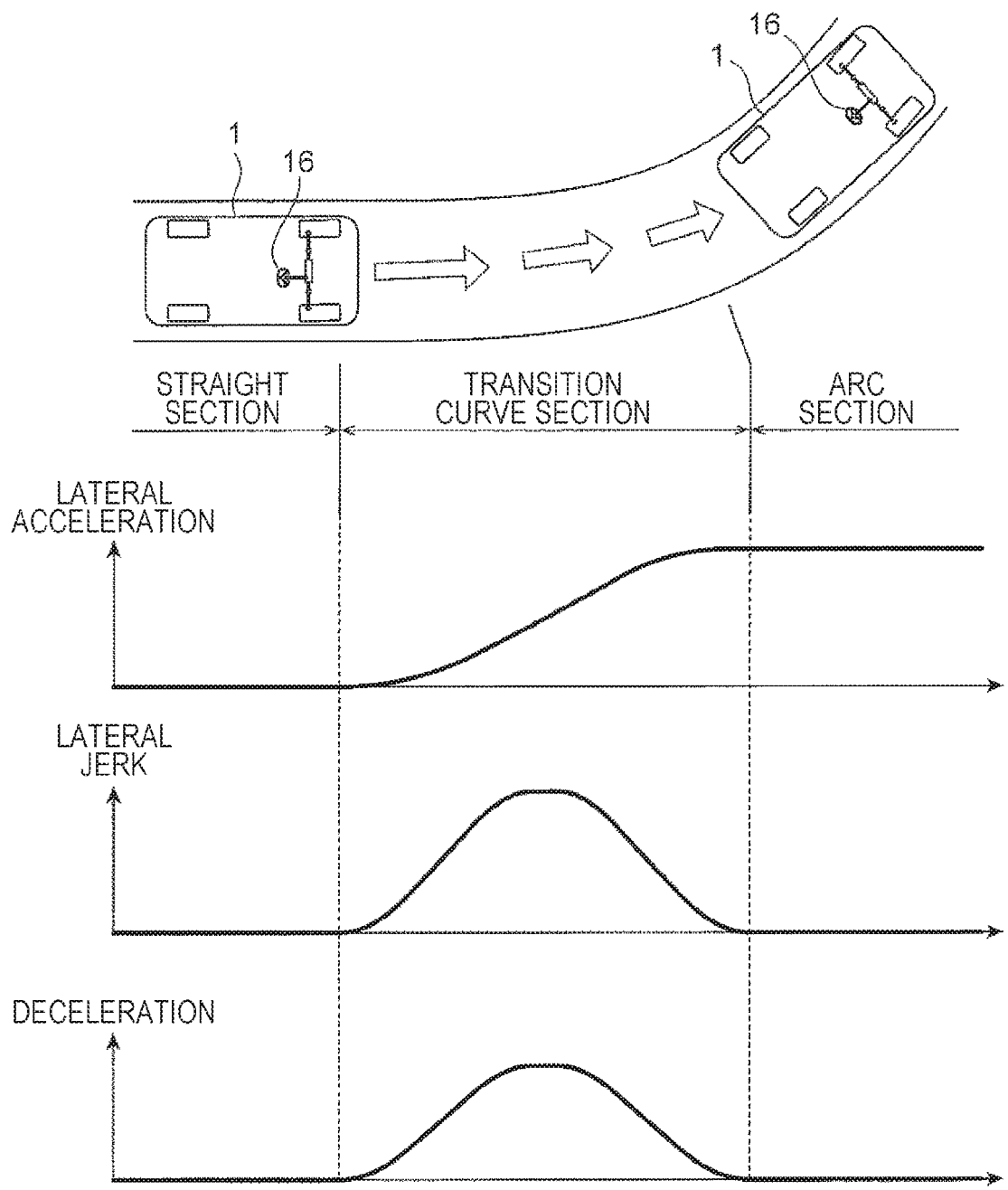
FIG. 7 is a diagram showing a mode of deceleration by GVC.

FIG. 7 shows a mode of deceleration by GVC. The lateral acceleration that is 0 in the straight section gradually increases in the transition curve section and becomes constant in the arc section. The fact that the lateral acceleration increases in the transition curve section means that the lateral jerk is occurring, and deceleration is determined according to the lateral jerk so that the braking force of the vehicle 1 is controlled.

The lateral acceleration and the lateral jerk are caused by the steering, which means that braking is necessarily performed at the time of steering. Therefore, the lateral acceleration and the lateral jerk are convenient to be combined with the steering wheel torque control by the braking force (by the vehicle motion integrated control device 15) of the present embodiment.

Figure 8:
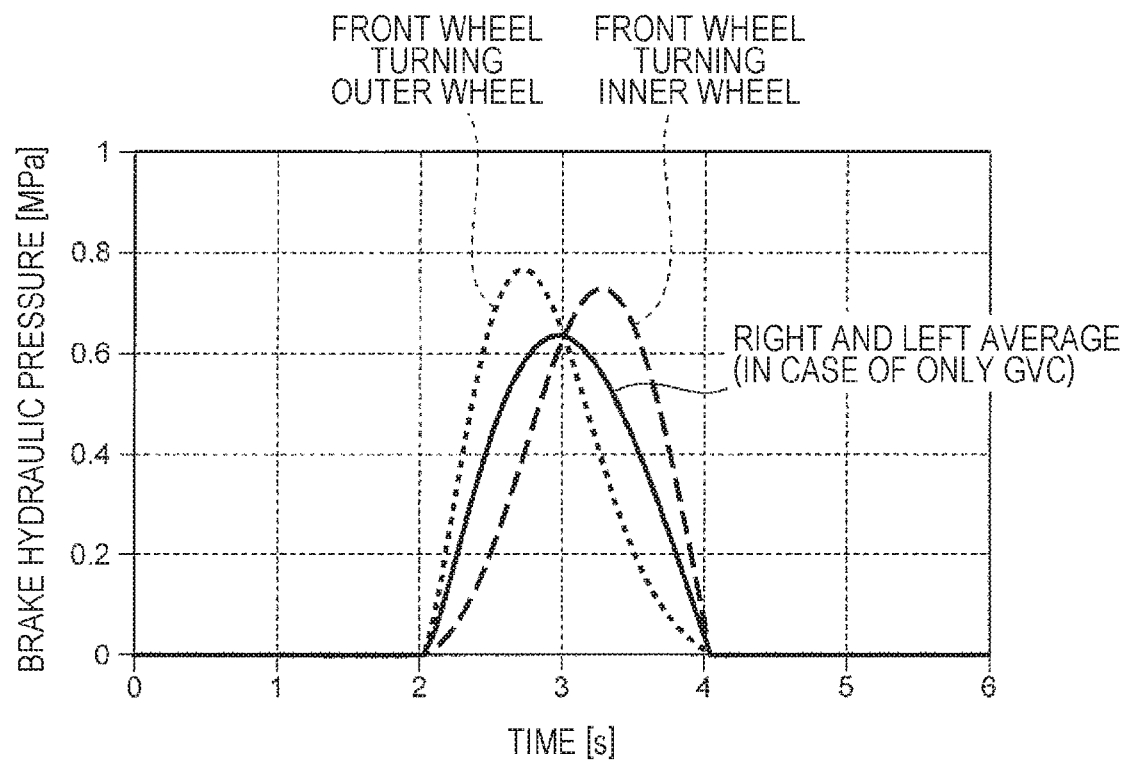
FIG. 8 is a diagram comparing brake hydraulic pressures of left and right steered wheels in the case where control by a vehicle control device of the present embodiment is added to the GVC and the case of only the GVC.

FIG. 8 is a diagram comparing brake hydraulic pressures of left and right front wheels 11, 12 that are the steered wheels, in the case where control by the vehicle motion integrated control device (vehicle control device) 15 of the present embodiment is added to the GVC and the case where only the GVC is used, in the steering pattern shown in FIG. 6.

In FIG. 8, the solid line indicates the average brake hydraulic pressure of the left and right front wheels 11, 12, and in the case of only GVC, the brake hydraulic pressures of the left and right front wheels 11, 12 are equal and all have the same waveform as the solid line, and the braking forces of the steered wheels 11, 12 are equal on the left and right. On the other hand, the brake hydraulic pressure of the front wheel turning inner wheel (in the illustrated example, the left front wheel 11) is indicated by the broken line, and the brake hydraulic pressure of the front wheel turning outer wheel (in the illustrated example, the right front wheel 12) is indicated by the dotted line in the case where the control by the vehicle motion integrated control device (vehicle control device) 15 of the present embodiment is added. As shown in the drawing, in (the vehicle motion integrated control device 15) of the present embodiment, the braking forces of the steered wheels 11, 12 are distributed to be larger in the turning outer wheel in a first half of the process from the turning start to the turning end of the steering wheel 16 (that is, the stage of the turning start), and the braking forces of the steered wheels 11, 12 are distributed to be larger in the turning inner wheel. As the principle described with reference to FIG. 2, since the relationship between which of the braking forces in the turning inner wheel or the turning outer wheel of the steered wheels 11, 12 is distributed to be larger, and the increase and decrease of the steering wheel torque depends on the positive or negative of the scrub radius. Thus, FIG. 8 shows an example in the case where the scrub radius is negative.

Figure 9:
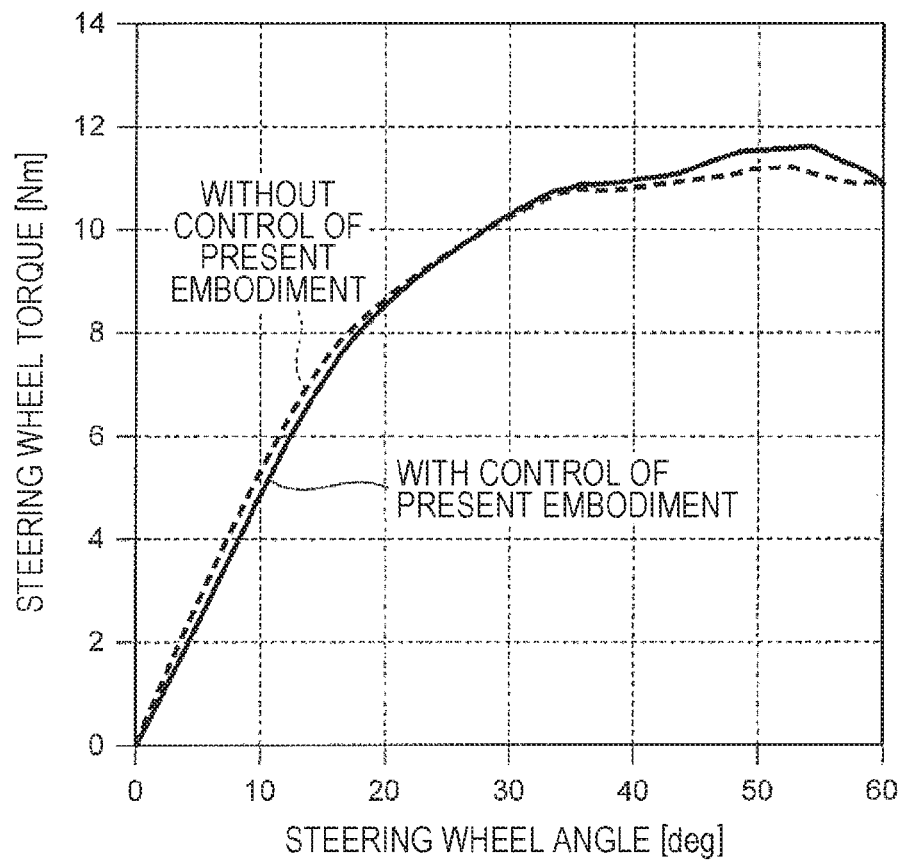
FIG. 9 is a diagram showing a simulation result of a steering wheel torque characteristic with respect to a steering wheel angle.

FIG. 9 shows a simulation result of a steering wheel torque characteristic with respect to a steering wheel angle, obtained as a result of control based on (Mathematical Formula 9) described above by the vehicle motion integrated control device (vehicle control device) 15 of the present embodiment. In FIG. 9, as in FIG. 8, comparison with the case of only GVC is shown.

In the case of presence of the control of the present embodiment indicated by the solid line, contrary to the case of absence of the control of the present embodiment indicated by the broken line (no braking force left and right distribution control, and only GVC), the steering wheel torque is small in the region of the turning start of the steering wheel 16, and is large in the region of the turning end. That is, an effect consistent with the desirable relationships described with reference to FIGS. 4 and 5 described above is obtained, and it can be said that the characteristic is improved to be easily controllable by the driver.

Here, in addition to the lateral force caused by the side slip angle of the tire, supplementary description will be made for the case where the lateral force due to disturbance acts on the tire.

In the present embodiment, the lateral force acting on the tire is not directly detected, but the calculated value according to (Mathematical Formula 10) described above is used. Therefore, even when the tire is subjected to a lateral disturbance due to a local change in p of the road surface, irregularities, or the like, the influence of the lateral force due to the disturbance is not applied to the method of imparting the braking force for the steering wheel torque control. As a result, the disturbance is transmitted to the steering wheel 16 without being particularly restrained. The purpose of the control of the present embodiment is to improve the steering accuracy by improving the characteristic of the steering wheel torque. Thus, although the control does not have an action to suppress unsteady disturbance, there is no fear that the control is excessively sensitive to disturbance as compared to the case where the control of the present embodiment is not performed.

As understood from the above description, according to the present embodiment, the braking force is controlled for each of the steering wheels 11, 12 (braking force left and right distribution control) on the basis of the lateral force acting on the steered wheels 11, 12, so that the steering reaction force (steering wheel torque) of the steering force generation device is controller, the steering feeling of the driver is improved, and thereby, the steering accuracy can be improved.

Second Embodiment

In the present embodiment, the case where a steering wheel torque (steering reaction force) imparted to a driver is controlled by a braking force and a driving force will be described. The difference from the first embodiment is steering wheel torque control in a vehicle in which not only the control force but also the driving force of the steered wheels (here, the left front wheel 11 and the right front wheel 12) can be controlled independently for left and right. Other configurations are substantially the same as those of the first embodiment. Therefore, the same reference numerals are given to the same configurations as those of the first embodiment, and the detailed description thereof will be omitted, and only the differences will be described in detail below.

Figure 10:
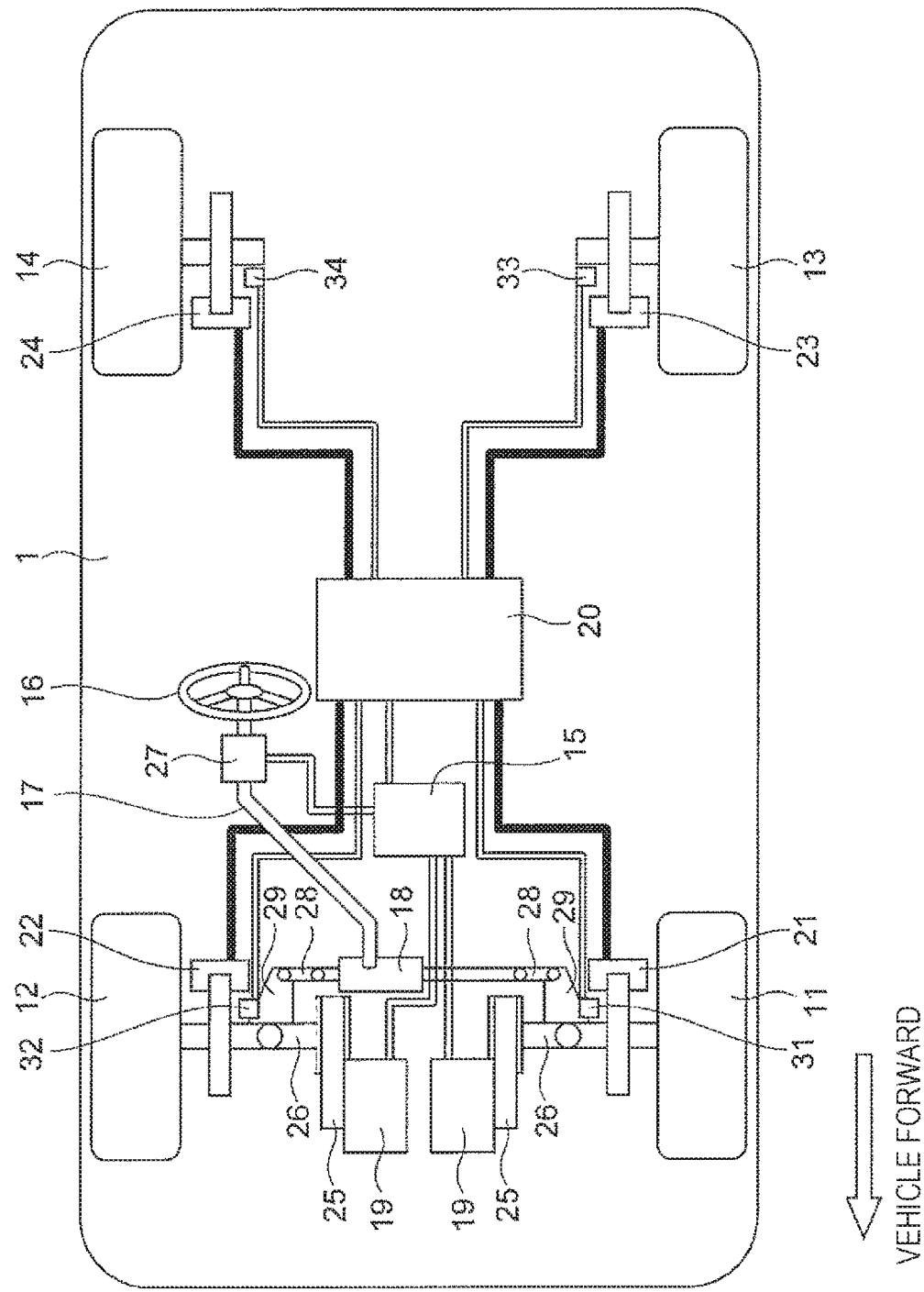
FIG. 10 is a diagram showing a system configuration of a mechanism and a control system of a vehicle including motors that independently drives left and right front wheels to which a second embodiment of the vehicle control device according to the present invention is applied.

FIG. 10 shows the system configuration of the mechanism and the control system of the vehicle having motors that drive the right and left front wheels independently. The difference from the system configuration shown in FIG. 1 is that the front wheels 11, 12 that are the steered wheels include the driving device 19 and the decelerator 25 independently for left and right. In addition to transmitting a braking force command to the braking control device 20, the vehicle motion integrated control device (vehicle control device of the second embodiment) 15 transmits a driving force command of the left and right front wheels 11, 12 to each driving device 19, and each driving device 19 generates the driving force for each of the left and right front wheels 11, 12 according to the received driving force command. Since the driving device 19 can also generate an arbitrary braking force as a negative driving force within the range of the performance, the vehicle motion integrated control device 15 distributes the command of the braking side to the braking control device 20 and the driving device 19 described above, to control the braking force of each wheel.

The left and right driving systems (of the steered wheels) are not necessarily completely separated. For example, the same control as below can be performed with a configuration in which the distribution of the driving force of the left and right (steered wheels) can be controlled by a torque transfer device that transmits the braking or driving torque between the left and right steered wheels, to distribute the left and right distribution of the braking/driving forces.

In the first embodiment in which the steering wheel torque is controlled only by the braking force, as indicated by (Mathematical Formula 13) described above, the upper limit $H_{MAX}$ of the control width of the steering wheel torque H inevitably depends on the total braking force of the left and right steered wheels 11, 12.

On the other hand, in (the vehicle motion integrated control device 15 of) the present embodiment, the steering wheel torque control can be performed not only in the case of steering during braking but also during steering during driving, and furthermore, one wheel (for example, the right front wheel 12) can be braked while the other wheel (for example, the left front wheel 11) can be driven. Therefore, while maintaining the total of the braking/driving forces acting on the vehicle 1, the left and right braking/driving force distribution of the steered wheels 11, 12 can be increased or decreased.

Figure 11:
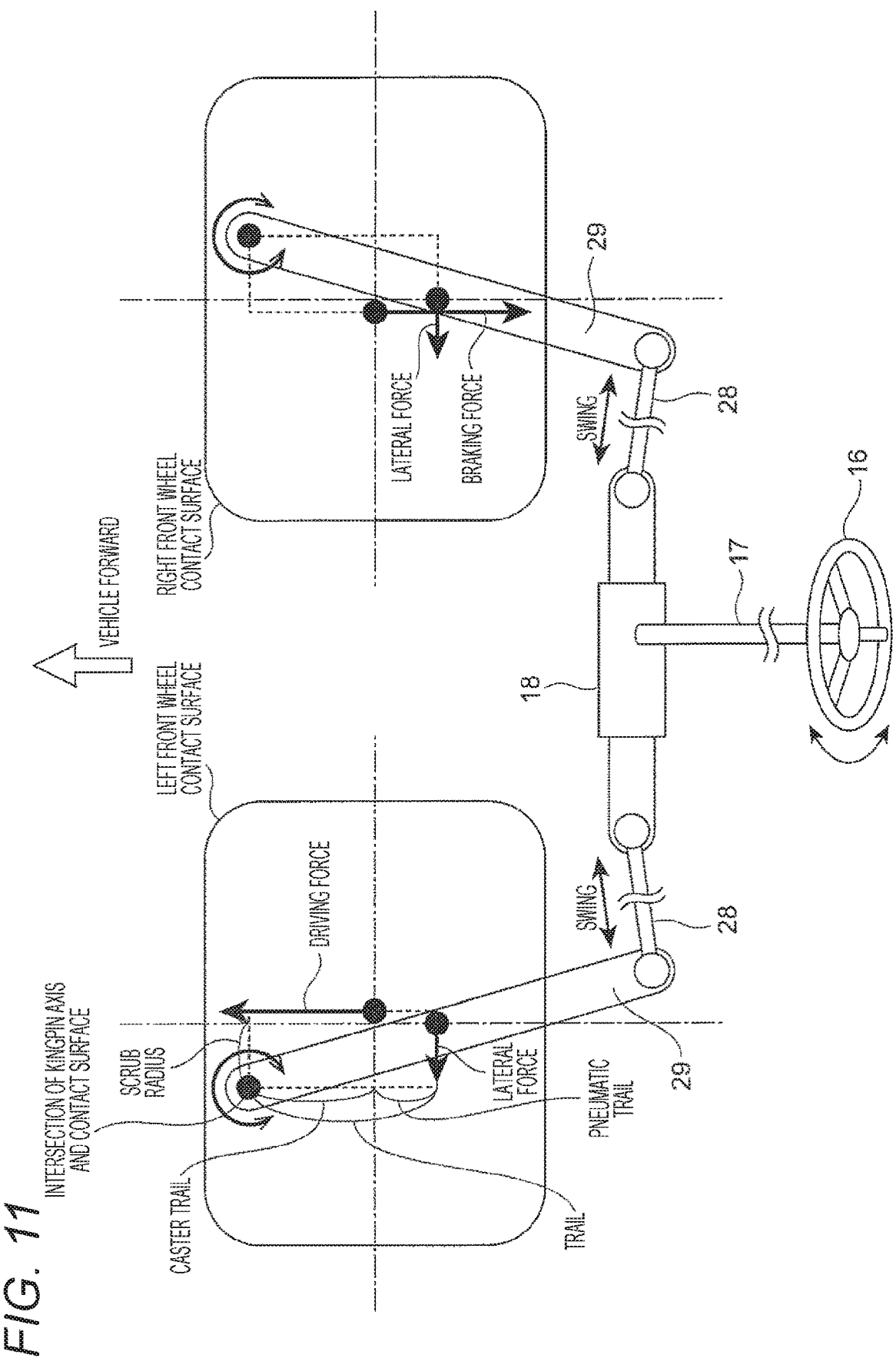
FIG. 11 is a diagram schematically showing a state in which a left front wheel is driven and a right front wheel is braked.

FIG. 11 is a diagram schematically showing a state in which the left front wheel 11 is driven and the right front wheel 12 is braked with the force of the same degree as the driving force of the left front wheel 11, and the vehicle 1 is not imparted with acceleration or deceleration in the front and rear direction. The principle of the steering wheel torque control is the same as in the first embodiment, and this is extended to the driving side.

Therefore, also in the present embodiment, as similar to the first embodiment, the braking/driving force control based on the steering angular acceleration and the lateral force of the steered wheels 11, 12 and the steering wheel torque control by the braking/driving force control are effective. In the present embodiment, a mechanism for unequal distribution of the torque to the left and right steered wheels 11, 12 is required also on the drive side, but the present embodiment has an effect that the steering torque can be controlled without depending on the braking or driving state of the entire vehicle 1.

Third Embodiment

In the present embodiment, the case where the steering force of the steering force generation device is controlled by the braking/driving forces in a vehicle having an automatic steering function that does not require steering wheel operation by a driver will be described.

The system configuration of the vehicle in the present embodiment is substantially the same as the system configuration of the vehicle of the first or second embodiment shown in FIG. 1 or FIG. 10, but here, the driver does not hold (operate) the steering wheel 16, so that only the electric power steering device 27 serves as a steering force generation device (see FIG. 1 or FIG. 10).

Unlike the first and second embodiments, in the present embodiment, since the driver does not hold the steering wheel 16, the steering wheel torque is not defined. In automatic steering that is angle control, friction feeling and inertia feeling do not impair the steering accuracy. However, since all of the steering forces to the steered wheels 11, 12 are generated by the electric power steering device 27, a mounting portion of the electric power steering device 27 to the vehicle body receives a relatively large force, and the apparent rigidity of the entire steering mechanism is relatively reduced. Since this hinders correct steering, there is still room for improvement in the control of the steering force.

Reduction in the apparent rigidity can be reduced by supplementing the steering force at a portion other than the electric power steering device 27. In the case of automatic steering, the steering mechanism receives forces from the electric power steering device 27 and the steered wheels 11, 12. Since the forces from the steered wheels 11, 12 are determined by the lateral force of the tire and the braking/driving forces as described in the first embodiment, similarly, the steering force of the steering mechanism can be reduced by controlling the steering force of the steering force generation device (the electric power steering device 27) by the braking/driving forces.

Figure 12:
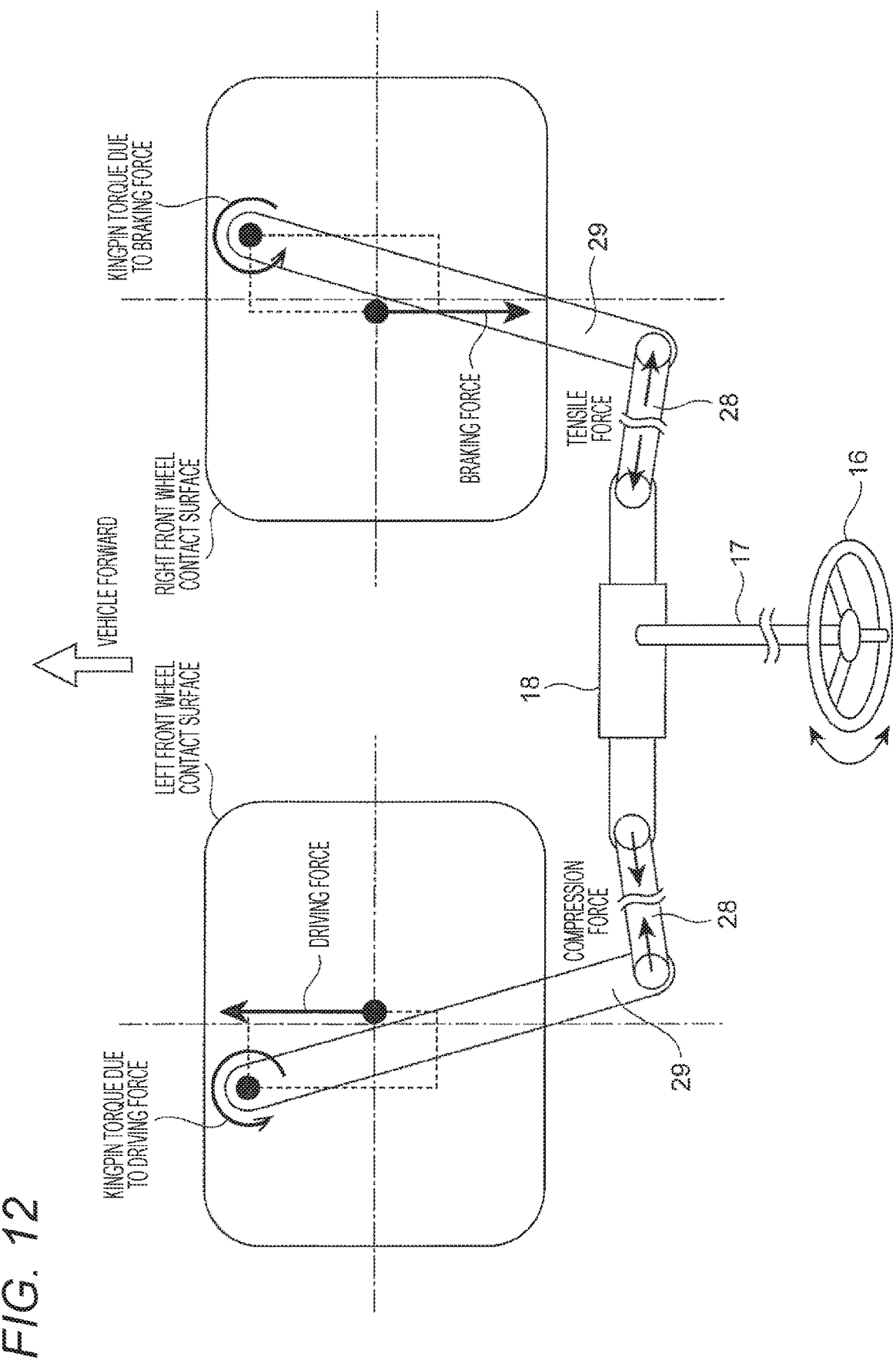
FIG. 12 is a diagram schematically showing a force caused by a braking or driving force acting on a steering mechanism when a difference between the left and right steered wheels is applied to the braking or driving force of the steered wheels in the vehicle to which a third embodiment of the vehicle control device according to the present invention is applied.

FIG. 12 is a diagram schematically showing a force caused by braking/driving forces acting on a steering mechanism when a difference between the left and right braking/driving forces of the steered wheels 11, 12 is applied. In FIG. 12, the same reference numerals are given to the same configurations as those of the first or second embodiment. When the left steered wheel 11 is driven and the right steered wheel 12 is braked, a force in the compression direction (compression force) is applied to the left steering tie rod 28 and a force in the tensile direction (tensile force) is applied to the right steering tie rod 28. If the braking/driving forces are not acting, when the vehicle is steered to the left, the left steering tie rod 28 receives a force in the tensile direction and the right steering tie rod 28 receives a force in the compression direction, so that this force can be canceled by setting a difference between the left and right braking/driving forces of the steered wheels 11, 12 (braking force left and right distribution control), and thereby, the force acting on any of the left and right steering tie rods 28 is also reduced.

Here, it is natural that the similar effect can be obtained when a difference is set between the left steered wheel 11 and the right steered wheel 12, even if only one of the braking force or the driving force can be controlled.

Although FIG. 12 focuses on the force acting on the steering tie rod 28, the force or torque acting on the steering column shaft 17, the steering rack 18, the steering knuckle 29 or the like is also reduced to a uniform extent. At the same time, the load on the electric power steering device 27 itself is also reduced, so that the force applied to the mounting portion to the vehicle body also decreases. In addition, the force or torque acting on a coupling portion between components is also reduced, and the deformation of a bush of the coupling portion not shown can be suppressed.

The control rule of the steering force in the present embodiment utilizes the braking/driving forces always in a direction of reducing the load. Thus, unlike (Mathematical Formula 11) in the first embodiment, the difference ($F_{LongL}-F_{LongR}$) between the left and right braking/driving forces of the steered wheels 11, 12 are imparted as the following (Mathematical Formula 14) in accordance with the lateral force, where a gain as a tuning parameter of the torque force is $P_F$. Here, the value of $P_F$ is determined so as to approach to the target steering force characteristic (the target value of the steering force of a predetermined steering force generation device).

$$F_{LongL}-F_{LongR}=(F_{LateralL}+F_{LateralR}) \cdot P_F \quad \text{(Mathematical Formula 14)}$$

Again, the information of the lateral force ($F_{LateralL}+F_{LateralR}$) in common with the first and second embodiments is used because, unless the lateral force is taken into consideration, even if the load of the steering mechanism can be reduced, the extent of the reducing is not become constant, and the apparent rigidity fluctuates, which adversely affects the steering accuracy.

Particularly, the bush in which the nonlinearity of the relationship between force and displacement is strong, and the backlash of each part of the mechanism, the steering accuracy is susceptible to the load fluctuation. What has the most extreme characteristics is backlash. If the direction of the force is reversed even with a small force, displacement for the amount of the backlash occurs, so that it is necessary to control with high precision so as not to cause hunting even in a region where the force is small. For that purpose, it is necessary to consider both the braking/driving forces and the lateral force that determine the kingpin torque.

In the case of a vehicle in which not only the automatic steering is performed and switching can be performed from the automatic steering to the manual steering, the control rule of (Mathematical Formula 11) and the control rule of (Mathematical Formula 14) may be switched.

Even in the case of manual steering, if the effect of improving the apparent rigidity of the steering mechanism is prioritized, the control rule of (Mathematical Formula 14) may be applied. In this case, suppression of the variation in correspondence between the steering wheel angle and the steering angle of the tire contributes to correct steering.

As understood from the above description, according to the present embodiment, the braking/driving forces are controlled for each of the steering wheels 11, 12 (braking/driving force left and right distribution control) on the basis of the lateral force acting on the steered wheels 11, 12, so that the appearance rigidity of the steering mechanism can be improved by controlling the steering force of the steering force generation device (the electric power steering device 27), and thereby, the steering accuracy can be improved.

Fourth Embodiment

In the first to third embodiments, only the braking/driving forces of the steering wheels (the left front wheel 11, the right front wheel 12) related to the steering wheel torque (steering reaction force) or the steering force are focused. However, if braking/driving forces of the steered wheels are set to different, a yaw moment with respect to the vehicle inevitably occurs.

Therefore, in the present embodiment, a method of compensating unnecessary yaw moment acting on the vehicle 1 in accordance with steering wheel torque control by the braking/driving forces of the steered wheels 11, 12 will be described.

The system configuration of the vehicle in the present embodiment is substantially the same as the system configuration of the vehicle according to the first or second embodiment shown in FIG. 1 or 10. Therefore, the same reference numerals are given to the same configurations as those of the first or second embodiment, and the detailed description thereof will be omitted, and only the differences will be described in detail below.

Figure 13:
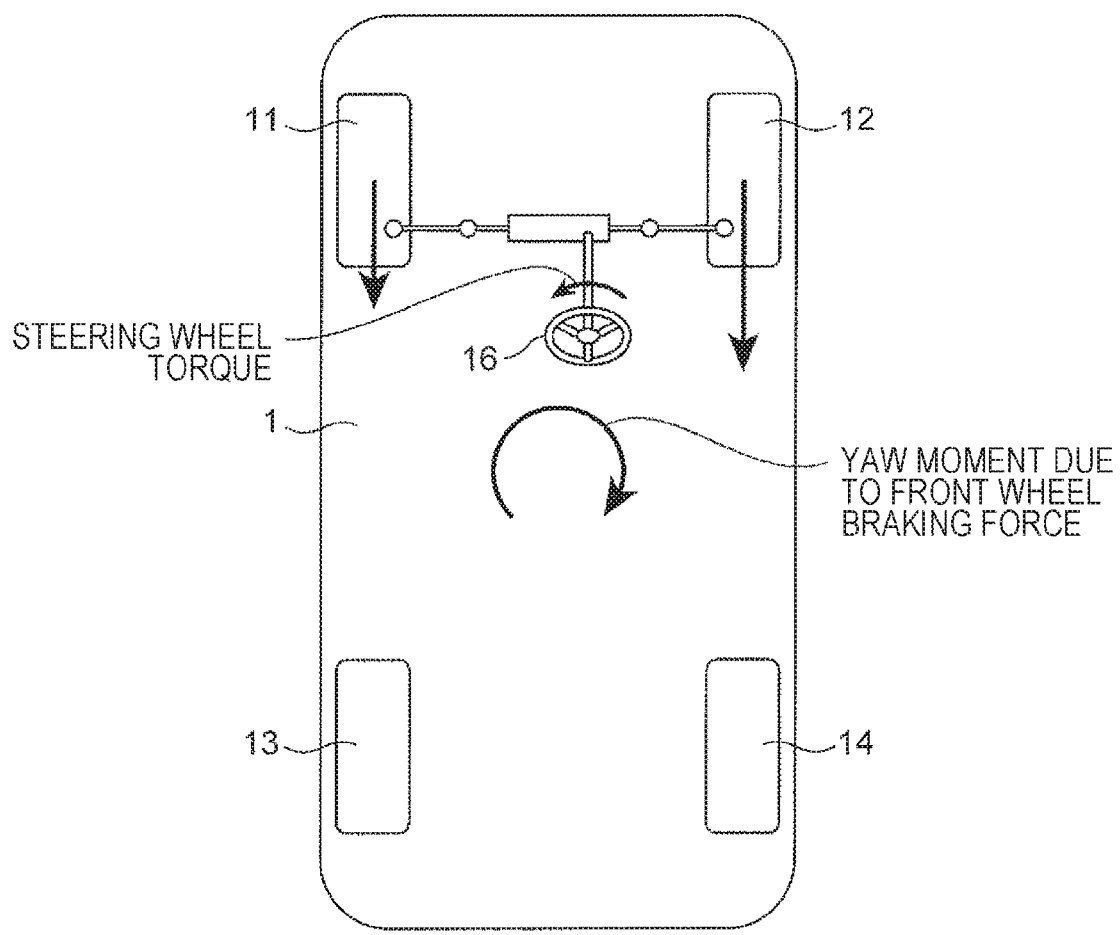
FIG. 13 is a diagram showing a yaw moment due to a difference between the braking forces of the left and right steered wheels in the vehicle to which a fourth embodiment of the vehicle control device according to the present invention is applied.

FIG. 13 shows the yaw moment due to the left and right difference of the braking forces of the steered wheels 11, 12.

Particularly, when the steering wheel torque imparted to the driver in the vehicle 1 having a negative scrub radius is reduced, in order to make the braking force of the right front wheel 12 larger than the braking force of the left front wheel 11 in turning to the left (see also FIG. 8) a yaw moment of directing the vehicle 1 to the right direction occurs. If this yaw moment is excessive, the yaw moment hinders the left turn and even if the characteristics of the steering wheel torque are improved by the above control, there is a possibility that the vehicle motion is adversely affected.

On the contrary, when the steering wheel torque imparted to the driver is reduced by the left and right difference of the braking forces of the steered wheels 11, 12 in the vehicle 1 having a positive scrub radius, a yaw moment of directing the vehicle 1 to the left direction in the left turn occurs. However, the addition of the yaw moment is not always necessary, and even in this case, there is a possibility that the yaw response becomes excessive.

In these cases, since the object is to control the steering wheel torque, it is effective to add control for compensating the excess or deficiency of the yaw moment generated by the braking/driving forces to the steered wheels 11, 12 (for example, excess or deficiency (increase or decrease) with respect to the yaw moment required for turning).

As shown in FIG. 1 or FIG. 10, in the vehicle 1 of the present embodiment, since the steered wheels coupled with the steering wheel 16 so that the steering power can be transmitted to the steering wheel 16 are the front wheels 11, 12, the force acting on the steered wheels 13, 14 has no direct influence on the steering wheel torque. Therefore, the vehicle motion integrated control device (vehicle control device) 15 of the present embodiment sets the braking/driving forces of the rear wheels 13, 14 to the left and right distribution opposite to the front wheels 11, 12, to compensate the excess or deficiency of the yaw moment.

A procedure for calculating the braking/driving force distribution of the four wheels for such control will be described.

First, the vehicle motion integrated control device 15 determines front and rear distribution of the braking force on the basis of axle weights of the front and rear wheels. Assuming that the vehicle weight is W and the front axle weight is $W_F$, the front and rear distribution of the braking force, that is, front:rear, is given by the following (Mathematical Formula 15).

$$W_F : W - W_F \qquad \text{(Mathematical Formula 15)}$$

As similar to the function of the conventionally known electronic brake force distribution (EBD), the front and rear distribution of the braking force may be determined in accordance with a dynamic axle weight.

Here, assuming that the left and right distribution of the braking forces of the front wheels 11, 12 that are steering wheels, that is, left:right, is the following (Mathematical Formula 16).

$$F_{LongL} : F_{LongR} \qquad \text{(Mathematical Formula 16)}$$

Since the yaw moment is determined by the difference between the left and right braking forces, in order to make the difference between the braking forces of the left and right rear wheels (the left rear wheel 13, the right rear wheel 14) the same as the difference between the braking forces of the left and right front wheels (the left front wheel 11, the right front wheel 12), the braking force distribution for the four wheels, that is, left front:right front:left rear:right rear, can be set as (Mathematical Formula 17) below.

$$F_{LongL} : F_{LongR} : ((W - W_F) \cdot (F_{LongL} + F_{LongR}) - W_F \cdot (F_{LongL} - F_{LongR}))/2W_F : F_{LongL} - F_{LongR} + ((W - W_F) \cdot (F_{LongL} + F_{LongR}) - W_F \cdot (F_{LongL} - F_{LongR}))/2W_F \qquad \text{(Mathematical Formula 17)}$$

Figure 14:
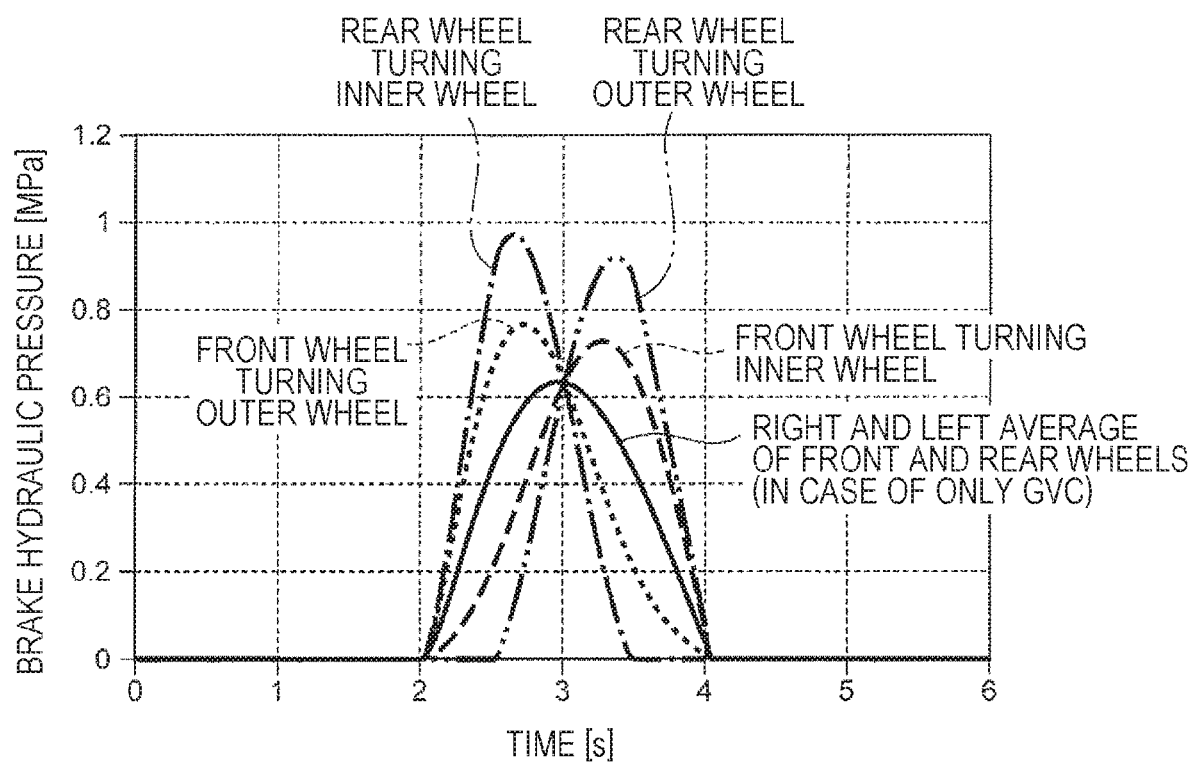
FIG. 14 is a diagram showing brake hydraulic pressures of left and right rear wheels, in addition to a comparison diagram shown in FIG. 8.

FIG. 14 additionally shows the brake hydraulic pressures of the left and right rear wheels controlled on the basis of the above (Mathematical Formula 17) in the comparison chart shown in FIG. 8 in the first embodiment. In FIG. 8, the brake hydraulic pressure of the front wheel turning inner wheel is indicated by a broken line, the brake hydraulic pressure of the front wheel turning outer wheel is indicated by a dotted line, the brake hydraulic pressure of the rear wheel turning inner wheel is indicated by a one-dot chain line, the brake hydraulic pressure of the rear wheel turning outer wheel is indicated by a two-dot chain line, and each of average left and right brake hydraulic pressures of the front and rear wheels is indicated by a solid line. In the case of only GVC, the brake hydraulic pressure of the four wheels is equal to the waveform of the solid line.

At the stage of the turning start of the steering wheel 16, the braking force is distributed larger in the turning outer wheel at the front wheel and the turning inner wheel at the rear wheel, and at the stage of the turning end, the braking force is distributed larger in the turning inner wheel at the front wheel and the turning outer wheel at the rear wheel, that is, operation of making the braking force to be biased in the wheels on the diagonal line. As exemplified here, in a vehicle in which the front wheel axle weight is larger than that of the rear wheel axle weight, in order to make the difference between the left and right braking forces equal between the front and rear wheels, the degree of the biasing is always larger in the rear wheels than the front wheels.

Here, the effect of the steering wheel torque control obtained by setting a difference between the braking forces of the left and right steered wheels 11, 12 is similar to that described with reference to FIG. 9 in the first embodiment.

FIGS. 15 and 16 show simulation results of the vehicle motion under the same conditions as those in FIG. 14. In the case where the broken line shown in FIG. 15 is only GVC, the solid line shown in FIG. 16 is the case where the brake hydraulic pressure required for the GVC is distributed to the left and right of each of the front and rear wheels.

Since the yaw moment is compensated by the control method described above, there is no significant difference in any of the front and rear acceleration, the lateral acceleration, and the yaw rate. Therefore, even if the steering wheel torque control is performed by the above control, it can be said that there is no substantial influence on the planar motion of the vehicle 1.

<Another Method for Compensating Excess or Deficiency of Yaw Moment>

In addition to the method in which the braking/driving forces of the rear wheels 13, 14 are adopted, a method for compensating excess or deficiency of the yaw moment (for example, excess or deficiency that is for the yaw moment required for turn, and is for the yaw moment in the case of only GVC that does not include the braking/driving force left and right distribution control of the present embodiment) will be described.

One of the methods is a method by rear wheel steering.

Figure 17:
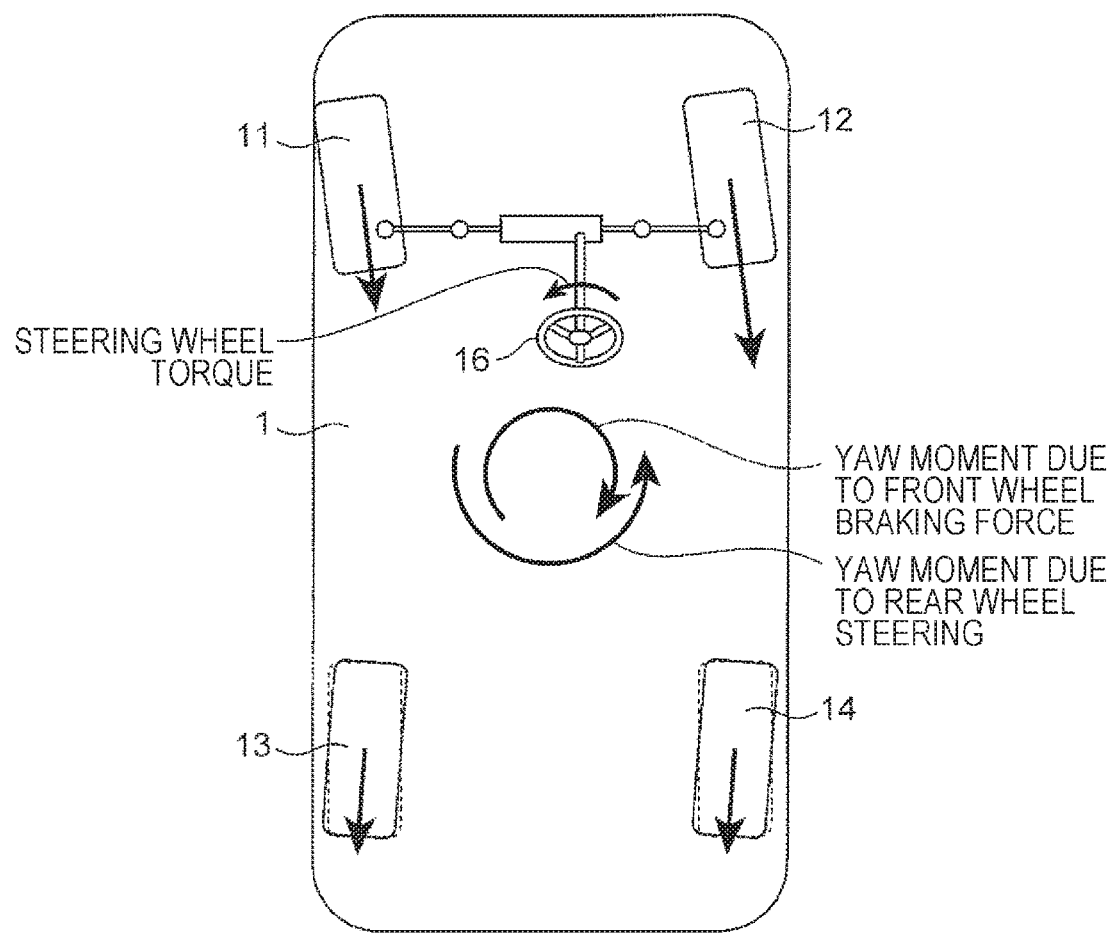
FIG. 17 is a diagram showing a situation of generating a yaw moment in a direction opposite to the yaw moment due to the braking force of the front wheels by the steering of the rear wheels.

FIG. 17 shows the situation where the yaw moment in the direction opposite to the yaw moment due to the braking force of the front wheels 11, 12 is generated by actively steering the rear wheels 13, 14.

In the case of the vehicle in which the rear wheels 13, 14 can be steered (the steering angle of the rear wheels 13, 14 can be changed), as similar to the front wheels 11, 12, while the yaw moment due to the braking force left and right distribution of the front wheels 11, 12 attempts to direct the vehicle 1 to the turning outside, the rear wheels 13, 14 are steered in the opposite phase from the front wheels 11, 12, so that the yaw moment that directs the vehicle 1 to the turning inside is generated. Also in this case, since being steered by actuators independent of the front wheels 11, 12, the rear wheels 13, 14 do not affect the steering wheel torque.

Another method is for making the steering gear ratio variable.

Figure 18:
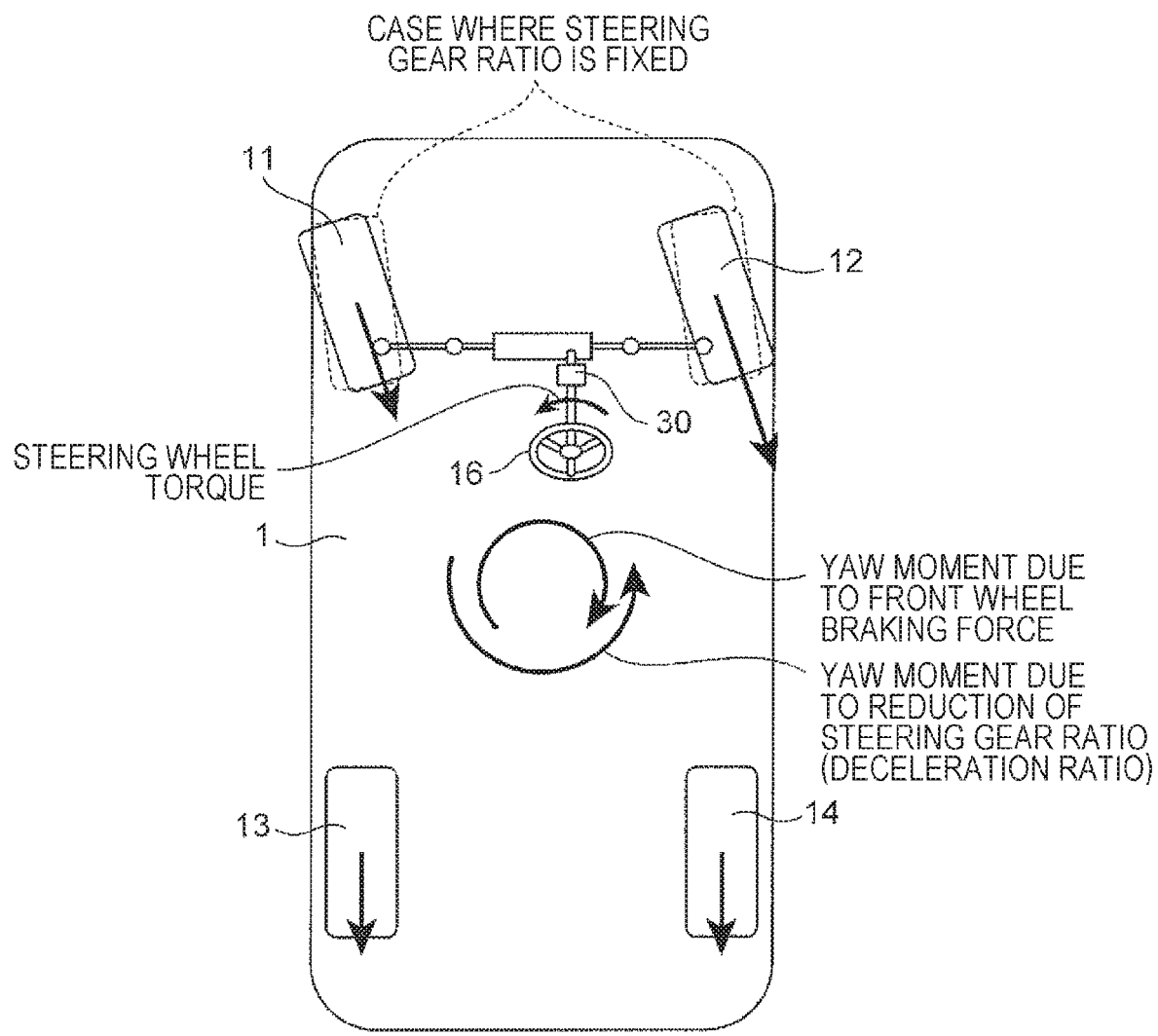
FIG. 18 is a diagram showing a situation of generating a yaw moment in a direction opposite to the yaw moment due to the braking force of the front wheels by a change in a steering gear ratio.

FIG. 18 shows a situation where the yaw moment opposite from the yaw moment due to the braking force of the front wheels 11, 12 is increased by increasing the steering angle of the front wheels 11, 12 more than the steering angle in the case (the state indicated by the broken line in FIG. 18) where the steering gear ratio (deceleration ratio) is reduced by the steering gear ratio variable control device 30 provided in the steering mechanism of the vehicle 1, so that the steering gear ratio is fixed. The steering angle of the wheels 11, 12 is increased for the amount of the attempt of directing the vehicle 1 to the turning outside by the yaw moment due to the braking force left and right distribution of the front wheels 11, 12, so that the yaw moment that directs the vehicle 1 to the turning inside is generated.

However, as the steering gear ratio is smaller, that is, as the steering angle of the wheel with respect to the steering wheel angle is larger, the steering wheel torque increases. Thus, when the left and right braking force distribution of the front wheels 11, 12 is biased, a direction in which the effect is cancelled is affected in the method described with reference to FIG. 18. Therefore, this method is suitable only for the case where the direction in which the steering wheel torque is desired to be increased or decreased, and the direction in which the yaw moment is desired to be increased or decreased are the same, or the case where the effect to the yaw moment is sufficient within a range where the influence by the change in the steering gear ratio on the steering wheel torque is minor.

<Application Example of Steering Wheel Torque Control by Vehicle Motion Integrated Control Device>

An overview will be given below of the case where the control is applied to a lane departure prevention device as an additional function of steering wheel torque control by the braking/driving forces of the steered wheels 11, 12.

In the fourth embodiment, a method of compensating for excess or deficiency (increase or decrease) of the yaw moment generated by controlling the braking/driving forces of the steered wheels 11, 12 and suppressing the influence on the vehicle motion has been described. However, there are cases where the vehicle motion should be actively controlled not only by the steering wheel torque control but also by application of the yaw moment. As a function to achieve the object by controlling both the steering wheel and the vehicle motion, an example in which the control by the vehicle motion integrated control device (vehicle control device) of the present embodiment is applied to the lane departure prevention device will be described.

Figure 19:
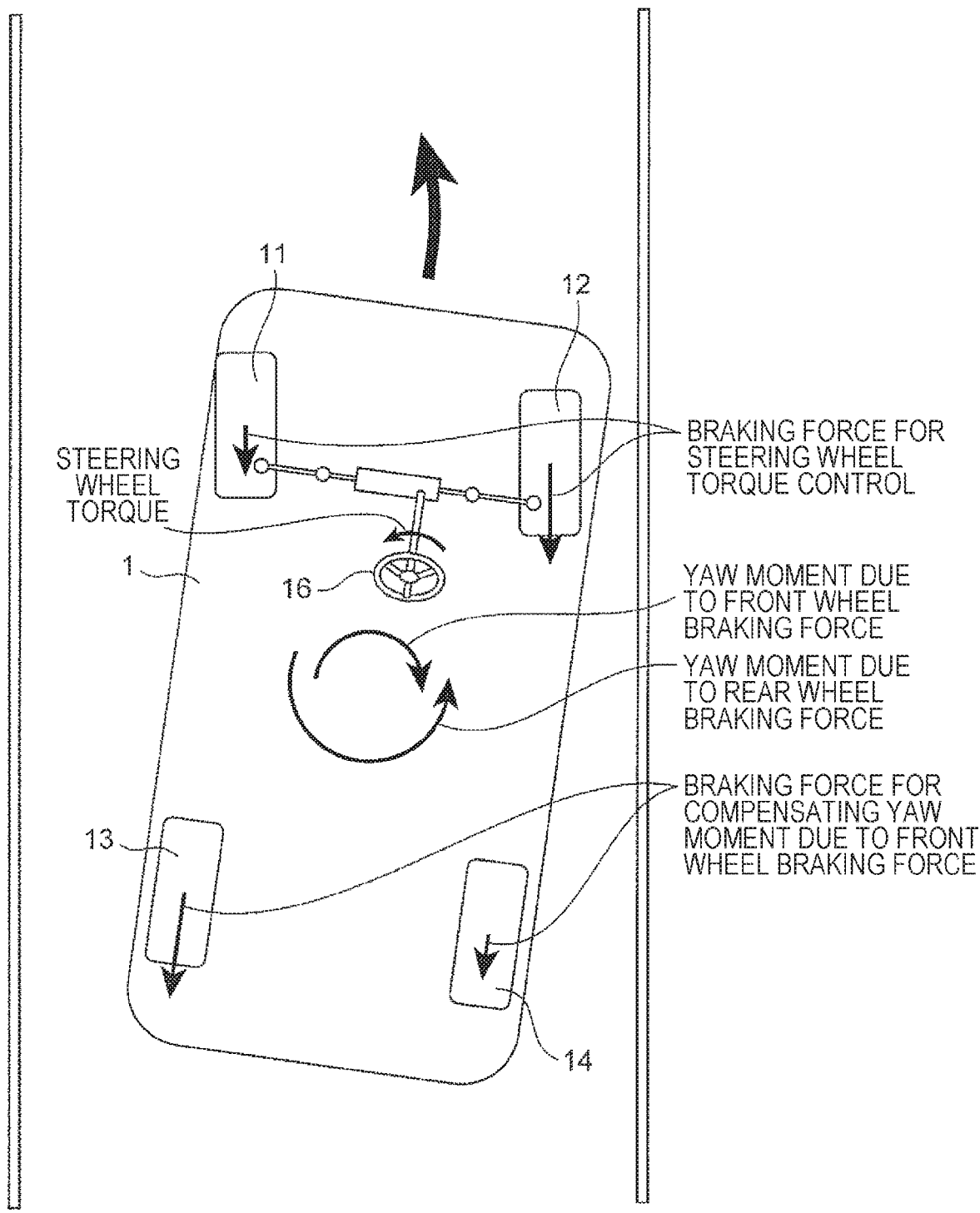
FIG. 19 is a diagram showing a mode of control for urging a driver to perform corrective steering by a steering wheel torque.
Figure 20:
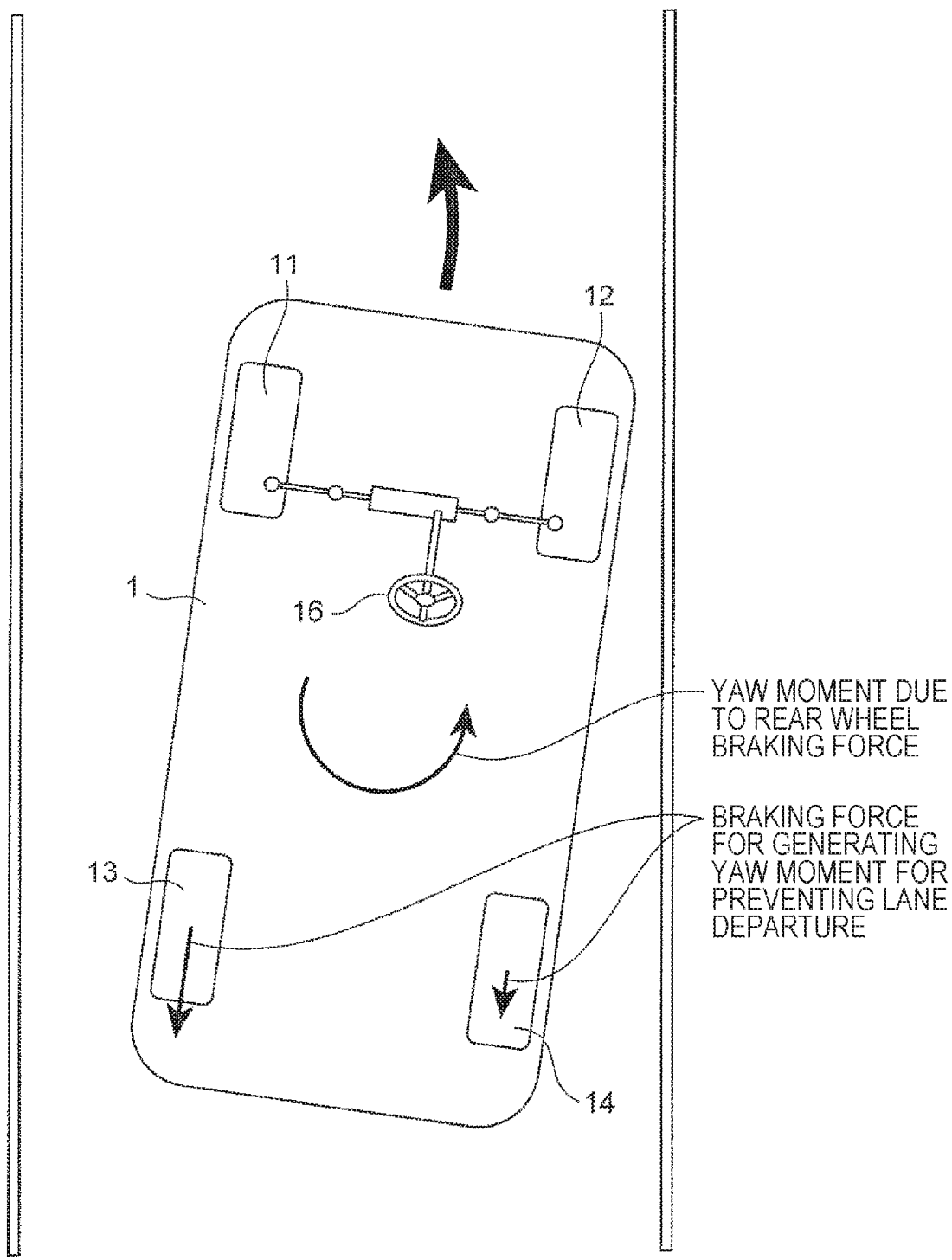
FIG. 20 is a diagram showing a control mode of imparting a yaw moment in a direction of returning a direction of the vehicle to the inside of a lane.

As a control method for preventing lane departure, there are, for example, a method of urging the driver of the vehicle 1 to perform the corrective steering by the steering wheel torque as shown in FIG. 19 and a method of imparting the yaw moment in the direction in which the direction of the vehicle 1 is returned to the inside the lane as shown in FIG. 20.

When only the latter is performed without performing the former, the driver is imparted with a feeling of forcedly changing the behavior of the vehicle 1. Therefore, even if the lane departure can be prevented, the driver is imparted with an uncomfortable driving feeling.

On the other hand, in the former, prior to the turn of the vehicle 1, the driver is imparted with information via the steering wheel torque, on the direction in which the corrective steering is performed. As a result, the driver recognizes that the corrective steering is necessary, and the driver performs fine steering in accordance with the direction of the steering wheel torque, or in some cases, performs fine steering within a range that the driver does not clearly notice, so that the vehicle 1 can be held in the lane. Therefore, the uncomfortable driving feeling to the driving can be alleviated.

Although the steering wheel torque control can be performed also by the electric power steering device 27, a high cost mechanism having high controllability is required in order to control the minute torque near the neutral steering angle with high accuracy. However, in (the vehicle motion integrated control device of) the present embodiment, since the steering wheel torque control can be performed independently of the controllability of the electric power steering device 27 by the left and right distribution of the braking/driving forces, the cost of the control can be suppressed.

Particularly, in the case of the vehicle 1 (see FIG. 10) having a mechanism capable of distributing the driving force of the steered wheels 11, 12 to the left and right, the steering wheel torque can be always controlled by changing the left and right distribution of the driving force even during constant speed travelling. Therefore, from the stage where the possibility of lane departure is small, the steering wheel torque is controlled such that the travelling in the middle of the lane can be easily maintained, so that the burden on the driver can be reduced. Then, only when the risk of the lane departure becomes high despite being constantly guided to the center of the lane by the steering wheel torque control, two-stage control can be performed, that is, the yaw moment is applied to the vehicle body by the left and right distribution of the braking/driving forces.

Even in the case of the vehicle 1 (see FIG. 1) having a mechanism in which only the braking force of the steered wheels 11, 12 can be distributed, two-stage control can be performed, that is, the steering wheel torque is controlled by the left and right distribution of the braking force at the initial stage where the possibility of lane departure occurs, and only when the driver does not perform sufficient corrective steering even with the steering wheel torque, the yaw moment is applied to the vehicle body by the left and right distribution of the braking force.

In the case of utilizing the braking force, since the vehicle 1 is decelerated, the steering wheel torque control is also limited to the case where there is a clear risk of lane departure, but as described above, the uncomfortable feeling of the driver can be alleviated by controlling the steering wheel torque before the yaw moment is imparted to the vehicle 1.

Fifth Embodiment

In the first to third embodiments, setting a difference between the left and right braking/driving forces of the steered wheels (the left front wheel 11, the right front wheel 12) has been described, and in the fourth embodiment, even in that case, the method with no substantial influence on the planer motion of the vehicle has been described. However, the braking/driving forces with respect to the steering wheel affect not only the planar motion of the vehicle but also the motion in the up and down direction.

Therefore, in the present embodiment, the case will be described where the steering wheel torque control by the braking/driving forces of the steered wheels 11, 12 is linked with the control of the electronic control suspension, so that the influence on the up and down motion of the vehicle 1 is suppressed.

The system configuration of the vehicle in the present embodiment is substantially the same as the system configuration of the vehicle according to the first or second embodiment shown in FIG. 1 or 10. Therefore, the same reference numerals are given to the same configurations as those of the first or second embodiment, and the detailed description thereof will be omitted, and only the differences will be described in detail below.

Generally, the wheels 11, 12, 13, 14 of the vehicle 1 are suspended by a suspension (electronic control suspension), and the suspension is generally configured such that the wheels 11, 12, 13, 14 are moved up and down along a track having an angle from a vertical direction (in other words, inclined with respect to the vertical direction). For this reason, a force in the up and down direction is generated as a component force of the braking/driving forces acting on each of the wheels 11, 12, 13, 14, and the force causes the suspension to expand and contract (in the up and down direction).

Generally the suspension geometry is set such that an anti-dive effect of lifting the vehicle body by the braking force can be obtained in the front wheels 11, 12, and an anti-squat effect of lifting the vehicle body by the driving force can be obtained in the rear wheels 13, 14. Thus, the same settings are assumed in the description hereinafter.

In the suspension of the left and right independent suspension, if there is a difference between the left and right braking/driving forces, there is also a difference between the left and right braking or driving forces in the up and down direction, so that a roll moment (rotational moment about the axle extending in the front and rear direction of the vehicle 1) is generated against the vehicle 1.

For example, when the braking force of the right front wheel 12 is larger than the braking force of the left front wheel 11, a state where the suspension provided on the left front wheel 11 tends to contract and the suspension provided on the right front wheel 12 is hard to contract, that is, a roll moment that attempts to incline the vehicle 1 to the left is generated. If this event occurs during the left turn, the centrifugal force acting on the vehicle body by turning is a roll moment that attempts to tilt the vehicle 1 to the right, which is convenient when the roll is desired to be suppressed. However, if this event occurs during the right turn, this event affects the direction in which the roll is promoted.

In the steering force control in the third embodiment, since control is always performed in a direction in which the steering force is reduced, the correspondence between the direction of the roll moment and the turning direction is constant. In this case, the suspension may be set such that the roll rigidity is set in consideration of the roll moment caused by the difference between the left and right braking/driving forces of the steered wheels 11, 12.

However, in the case of the steering wheel torque control in accordance with the steering angular acceleration in the first and second embodiments, the direction in which the roll is suppressed and the direction in which the roll is promoted are switched at the turning start and the turning end of the steering wheel 16. That is, there is a possibility that the suppressing action and the promoting action for the roll are reversed during turning of the steering wheel 16, and the change in a roll feeling becomes excessive.

In order to suppress this, (the vehicle motion integrated control device of) the present embodiment actively controls the roll behavior of the vehicle 1 using the electronic control suspension.

FIG. 21 is a table showing the direction of the influence on the steering wheel torque and the roll moment by the bias of the braking force in the left and right of the steered wheels 11, 12 in the left turn of the vehicle 1 having a negative scrub radius.

At the stage of the left turn of the vehicle 1 having a negative scrub radius and the turning start of the steering wheel 16, in order to impart a larger braking force to the right front wheel 12 than that of the left front wheel 11 (see also FIG. 8), the steering wheel torque is reduced and the roll moment is suppressed. At the stage of the turning end of the steering wheel 16, in order to impart a larger braking force to the left front wheel 11 than that of the right front wheel 12 (see also FIG. 8), the steering wheel torque is increased and the roll moment is suppressed. A roll moment is imparted to the vehicle 1 by the suspension control so as to suppress the transition from suppression of the roll moment to promotion of roll moment.

As a method of controlling the roll moment by such a suspension control, there are, for example, the following four methods.

For example, when roll moment control is performed with an electronic control suspension having an active anti-roll bar actively making the roll rigidity variable, the electronic control suspension is controlled in a direction in which the roll rigidity is reduced at the turning start of the steering wheel 16, and the roll rigidity is increased at the turning end.

In the case of performing the roll moment control with the electronic control suspension having the function of making the spring constant variable, the electronic control suspension is controlled in a direction in which the spring constant of the turning outer wheel of the steered wheels 11, 12 is relatively reduced more than the spring constant of the turning inner wheel at the turning start of the steering wheel 16, and the spring constant of the turning outer wheel of the steered wheels 11, 12 is relatively increased more than the spring constant of the turning inner wheel at the turning end.

In the case of performing the roll moment control with the electronic control suspension having the function of making a vehicle height variable, the electronic control suspension is controlled in a direction in which the vehicle height of the turning outer wheel of the steered wheels 11, 12 is relatively increased more than the vehicle height of the turning inner wheel at the turning start of the steering wheel 16, and the vehicle height of the turning outer wheel of the steered wheels 11, 12 is relatively reduced more than the vehicle height of the turning inner wheel at the turning end.

In the case of performing the roll moment control with the electronic control suspension having the function of making a damping force variable, at the turning start of the steering wheel 16, a contraction side damping force of the turning outer wheel of the steered wheels 11, 12 is reduced, an expansion side damping force of the turning inner wheel of the steered wheels 11, 12 is reduced, or both are performed. On the other hand, at the turning end of the steering wheel 16, the contraction side damping force of the turning outer wheel of the steered wheels 11, 12 is increased, the expansion side damping force of the turning inner wheel of the steered wheels 11, 12 is increased, or both are performed. The roll amount of the vehicle 1 can be controlled even with the electronic control suspension having the function of making only the damping force variable, since it is sufficient to that the transient rolling behavior from the turning start to the turning end of the steering wheel 16 is handled.

Furthermore, it is natural that a plurality of the above control methods may be combined at the same time.

As described above, in the present embodiment, the control of the suspension is linked with the steering wheel torque control, so that even if the change of the roll moment accompanying the steering wheel torque control (that is, the influence on the motion in the up and down direction of the vehicle 1) is excessive, a change in the roll moment as described above can be prevented.

The present invention is not limited to each of the embodiments described above, and various modifications are included. Each of the embodiments described above has been described in detail in order to explain the present invention in an easy-to-understand manner, and the present invention is not necessarily limited to those having all the configurations described in the embodiments. A part of the configuration of one embodiment can be replaced by the configuration of another embodiment, and the configuration of another embodiment can be added to the configuration of one embodiment. With respect to part of the configuration of each embodiment, other configurations can be added, deleted, or replaced.

REFERENCE SIGNS LIST

1 vehicle
11 left front wheel
12 right front wheel
13 left rear wheel
14 right rear wheel
15 vehicle motion integrated control device (vehicle control device)
16 steering wheel
17 steering column axis
18 steering rack
19 drive device
20 braking control device
21 left front wheel braking device
22 right front wheel braking device
23 left rear wheel braking device
24 right rear wheel braking device
25 decelerator
26 drive shaft
27 electric power steering device
28 steering tie rod
29 steering knuckle
30 steering gear ratio variable device
31 left front wheel speed sensor
32 right front wheel speed sensor
33 left rear wheel speed sensor
34 right rear wheel speed sensor

The invention claimed is:

1. A vehicle control device that controls a vehicle, the vehicle comprising:
   a left-right pair of steered wheels of which braking/driving forces can be controlled for each of left and right;
   another wheel that is provided separately from the left-right pair of steered wheels; and
   a steering force generation device that generates a steering force for the steered wheels and controls a steering angle of the steered wheels, wherein
   the vehicle control device is configured to control the steering force or steering reaction force of the steering force generation device by controlling the braking/driving forces for each of the steered wheels on the basis of a lateral force acting on the steered wheels, and
   the vehicle control device is also configured to control braking/driving forces to the another wheel so as to compensate excess or deficiency of a yaw moment generated by controlling the braking/driving forces of the steered wheels.

2. The vehicle control device according to claim 1, wherein the lateral force is calculated on the basis of the steering angle of the steered wheels and a vehicle speed of the vehicle.

3. The vehicle control device according to claim 1, wherein the lateral force is calculated on the basis of a lateral acceleration of the vehicle.

4. The vehicle control device according to claim 1, wherein the vehicle control device controls the braking/driving forces on the basis of the lateral force and a predetermined target value of the steering force or the steering reaction force of the steering force generation device.

5. The vehicle control device according to claim 1, wherein the vehicle control device controls the braking/driving forces such that a difference between the braking forces or driving forces of the left-right pair of steered wheels is larger as the lateral force is larger.

6. The vehicle control device according to claim 1, wherein the vehicle comprises another wheel provided separately from the left-right pair of steered wheels, and
the vehicle control device controls a steering angle of the other wheel so as to compensate excess or deficiency of a yaw moment generated by controlling the braking/driving forces of the steered wheels.

7. The vehicle control device according to claim 1, wherein the vehicle comprises a mechanism capable of variably controlling a steering gear ratio that is a ratio of the steering angle of the left-right pair of steered wheels with respect to a steering wheel angle of a steering wheel included in the steering force generation device, and
the vehicle control device controls the steering gear to control a steering angle of the steered wheels so as to compensate excess or deficiency of a yaw moment generated by controlling the braking/driving forces of the steered wheels.

8. The vehicle control device according to claim 1, wherein the vehicle comprises a suspension that suspends the left-right pair of steered wheels independently for left and right, and
the vehicle control device controls the suspension so as to suppress a change in a roll moment generated by controlling the braking/driving forces of the steered wheels.

9. The vehicle control device according to claim 1, wherein the vehicle control device controls the braking/driving forces on the basis of a steering angular acceleration of the steered wheels.

10. The vehicle control device according to claim 1, wherein the vehicle control device controls the braking force such that a larger braking force is distributed from a turning outer wheel to a turning inner wheel of the left-right pair of steered wheels, in a turning process of a vehicle having a negative scrub radius of the steered wheels.

11. A vehicle control method for controlling a vehicle, the vehicle comprising:
providing a left-right pair of steered wheels of which braking/driving forces can be controlled for each of left and right;
providing another wheel that is provided separately from the left-right pair of steered wheels;
generating, using a steering force generation device, a steering force for the steered wheels and controls a steering angle of the steered wheels, wherein the steering force or a steering reaction force of the steering force generation device is controlled by controlling the braking/driving forces for each of the steered wheels on the basis of a lateral force acting on the steered wheels; and
controlling, using a vehicle control device, braking/driving forces to the another wheel so as to compensate excess or deficiency of a yaw moment generated by controlling the braking/driving forces of the steered wheels.

12. The vehicle control device according to claim 1, wherein lane departure prevention control is performed, prior to the turn of the vehicle, and the driver is imparted with information via the steering wheel torque, on the direction in which the corrective steering is performed.

13. The vehicle control device according to claim 1, wherein lane departure prevention control is performed, and the steering wheel torque is controlled such that the vehicle is guided to the center of the lane.

14. The vehicle control method according to claim 11, wherein lane departure prevention control is performed, prior to the turn of the vehicle, and the driver is imparted with information via the steering wheel torque, on the direction in which the corrective steering is performed.

15. The vehicle control method according to claim 11, wherein lane departure prevention control is performed, and the steering wheel torque is controlled such that the vehicle is guided to the center of the lane.

* * * * *